United States Patent
Kokojima et al.

(10) Patent No.: US 6,728,636 B2
(45) Date of Patent: Apr. 27, 2004

(54) DESTINATION GUIDANCE SYSTEM AND METHOD FOR GENERATING INDIVIDUALLY TAILORED ROUTES WITHIN A COMPLEX STRUCTURE

(75) Inventors: Yoshiyuki Kokojima, Yokohama (JP); Hiroshi Sugiyama, Kawasaki (JP); Miwako Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 10/254,941

(22) Filed: Sep. 26, 2002

(65) Prior Publication Data
US 2003/0060978 A1 Mar. 27, 2003

(30) Foreign Application Priority Data

Sep. 26, 2001 (JP) .................................. 2001-292866
Feb. 28, 2002 (JP) .................................. 2002-052771

(51) Int. Cl.$^7$ .............................................. G01C 21/30
(52) U.S. Cl. ................... 701/211; 701/208; 701/209; 340/990; 340/995.1
(58) Field of Search ................................. 701/200, 201, 701/208, 209, 23, 25, 210, 211; 340/990, 995.1, 988

(56) References Cited

U.S. PATENT DOCUMENTS 5,787,383 A * 7/1998 Moroto et al. ............... 701/210
6,333,702 B1 * 12/2001 Hiyokawa et al. ...... 340/995.21
6,336,072 B1 * 1/2002 Takayama et al. .......... 701/200
6,339,746 B1 1/2002 Sugiyama et al.

FOREIGN PATENT DOCUMENTS

JP 10-319839 12/1998

OTHER PUBLICATIONS

Y. Kokojima, et at., "Routing Method for Pedestrian in Large Field," National Convention of IPSJ, Mar. 12, 2002, 2 pages.

* cited by examiner

*Primary Examiner*—Gertrude A. Jeanglaude
(74) *Attorney, Agent, or Firm*—Oblon, Spivak, McClelland, Maier & Neustadt, P.C.

(57) ABSTRACT

This invention is directed to a destination guidance system for providing presentation information that contains guidance pertaining to movement from a place of departure to a destination on the basis of structure information and guidance information on the premises of a building or construction. The presentation information contains both information of the entire three-dimensional structure, and detailed information, and a three-dimensional movement and normal two-dimensional movement in the presentation information are presented by different methods. Also, this invention is directed to a destination guidance data acquisition system for acquiring structure information and guidance information on the premises of a building, which are used by the destination guidance system. The destination guidance data acquisition system inputs and compiles information of a three-dimensional structure on the basis of a plan view of the building to support acquisition of the detailed information.

35 Claims, 36 Drawing Sheets

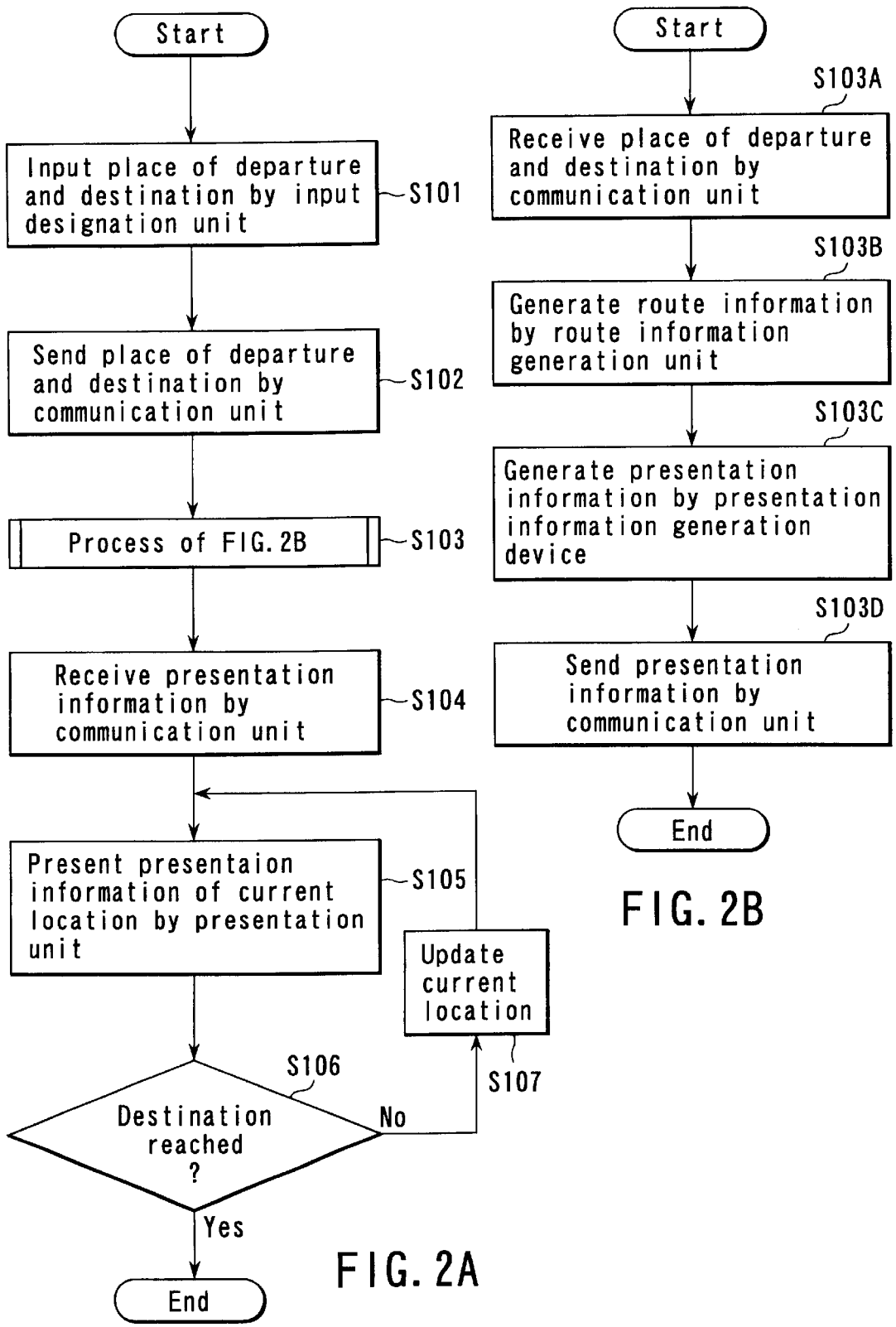

FIG. 3A

Place of departure:
[                    ]
[              ] [Search]

Destination:
[                    ]
[              ] [Search]

[Reset] [Destination guidance GO]

FIG. 3B

Place of departure:
[                    ]
[ S station, T line ] [Search]

Destination:
[                    ]
[              ] [Search]

[Reset] [Destination guidance GO]

FIG. 3C

Search result (S station, T line):

T line, south exit
Platform No.1 (for A)
[Platform No.2 (for A)]
Platform No.3 (for A)
Platform No.4 (for A)
T line, ticket booth
T line, train pass booth

FIG. 3D

Place of departure:
- Platform No.2 (for A)
- S station, T line [Search]

Destination:
- 
- S station, Y line [Search]

[Reset] [Destination guidance GO]

FIG. 3E

Search result (S station, Y line):
- Y line, central exit
- Y line, south exit
- Y line, north exit
- Y line, outer track platform No.1 (for B)
- Y line, inner track platform No.2 (for C)
- Y line, ticket booth

FIG. 3F

Place of departure:
- Platform No.2 (for A)
- S station, T line [Search]

Destination:
- Y line, outer track platform No.1 (for B)
- S station, Y line [Search]

[Reset] [Destination guidance GO]

| Start point ID | End point ID |
|---|---|
| 10 | 11 |
|  | 13 |
| 11 | 10 |
|  | 12 |
|  | 13 |
| 12 | 11 |
|  | 13 |
| 13 | 10 |
|  | 11 |
|  | 12 |
|  | 20 |
| 20 | 13 |
|  | 21 |
| 21 | 20 |
|  | 22 |
|  | 23 |
| 22 | 21 |
| 23 | 21 |

| Guide point ID | Three-demensional coordinates |
|---|---|
| 10 | (-8, 6, 0) |
| 11 | (-7, 6, 0) |
| 12 | (-6, 6, 0) |
| 13 | (-7, 5, 0) |
| 20 | (-7, 0, 5) |
| 21 | (-4, 0, 5) |
| 22 | (-3, 0, 5) |
| 23 | (-4, -2, 5) |

| Start point ID | End point ID |
|---|---|
| 13 | 10 |
| 20 | 13 |
| 21 | 20 |
| 23 | 21 |

| Guide point ID | Three-demensional coordinates |
|---|---|
| 10 | (-8, 6, 0) |
| 13 | (-7, 5, 0) |
| 20 | (-7, 0, 5) |
| 21 | (-4, 0, 5) |
| 23 | (-4, -2, 5) |

| Guide point | Direction | Landmark data | Landscape data (image file name) |
|---|---|---|---|
| 10 | Approach | Platform No.2 in front, shop on the right | 13-10in |
|  | Exit | - | - |
| 13 | Approach | Shop in front, platform No.1 on the right, platform No.2 on the left | 20-13in |
|  | Exit | Platform No.2 in front, shop on the right | 13out-10 |
| 20 | Approach | Cross, down stairs on the right | 21-20in |
|  | Exit | Down stairs in front | 20out-13 |
| 21 | Approach | T-shaped path | 23-21in |
|  | Exit | Cross in front | 21in-20 |
| 23 | Approach | - | - |
|  | Exit | T-shaped path in front | 23out-21 |

FIG. 6

| Guide point | Approach direction | Exit direction | Next direction to go |
|---|---|---|---|
| 10 | Left 45° | – | – |
| 13 | Down 45° | Left 45° | Left 45°, up 45° |
| 20 | Left 90° | Down 45° | Right 90°, down 45° |
| 21 | 0° | Left 90° | Left 90° |
| 23 | – | 0° | – |

| Guide point | Direction | Landmark data | Landscape data (image file name) | Next direction to go |
|---|---|---|---|---|
| 23 | Approach | — | — | — |
|  | Exit | T-shaped path in front | 23out-21 | — |
| 21 | Approach | T-shaped path | 23-21in | Left 45°, Up 45° |
|  | Exit | Cross in front | 21in-20 | — |
| 20 | Approach | Cross, down stairs on the right | 21-20in | Right 90°, down 45° |
|  | Exit | Down stairs in front | 20out-13 | — |
| 13 | Approach | Shop in front, platform No.1 on the right, platform No.2 on the left | 20-13in | Left 90° |
|  | Exit | Platform No.2 in front, shop on the right | 13out-10 | — |
| 10 | Approach | Platform No.2 in front, shop on the right | 13-10in | — |
|  | Exit | — |  |  |

FIG. 8

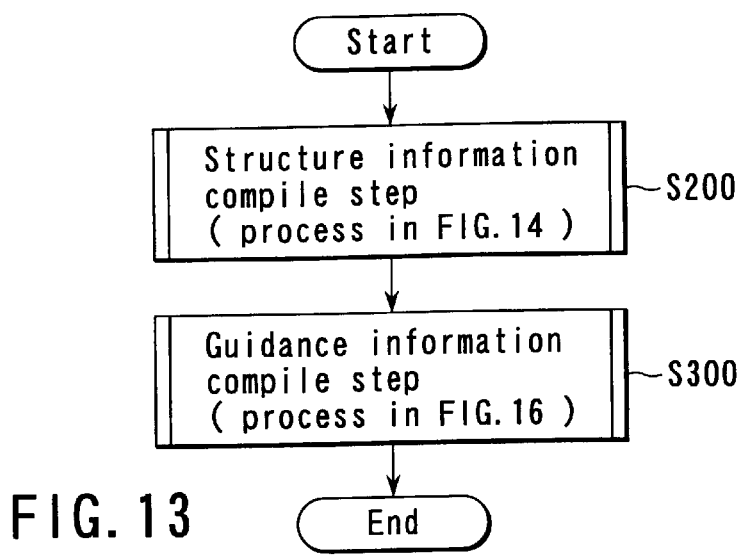
FIG. 13
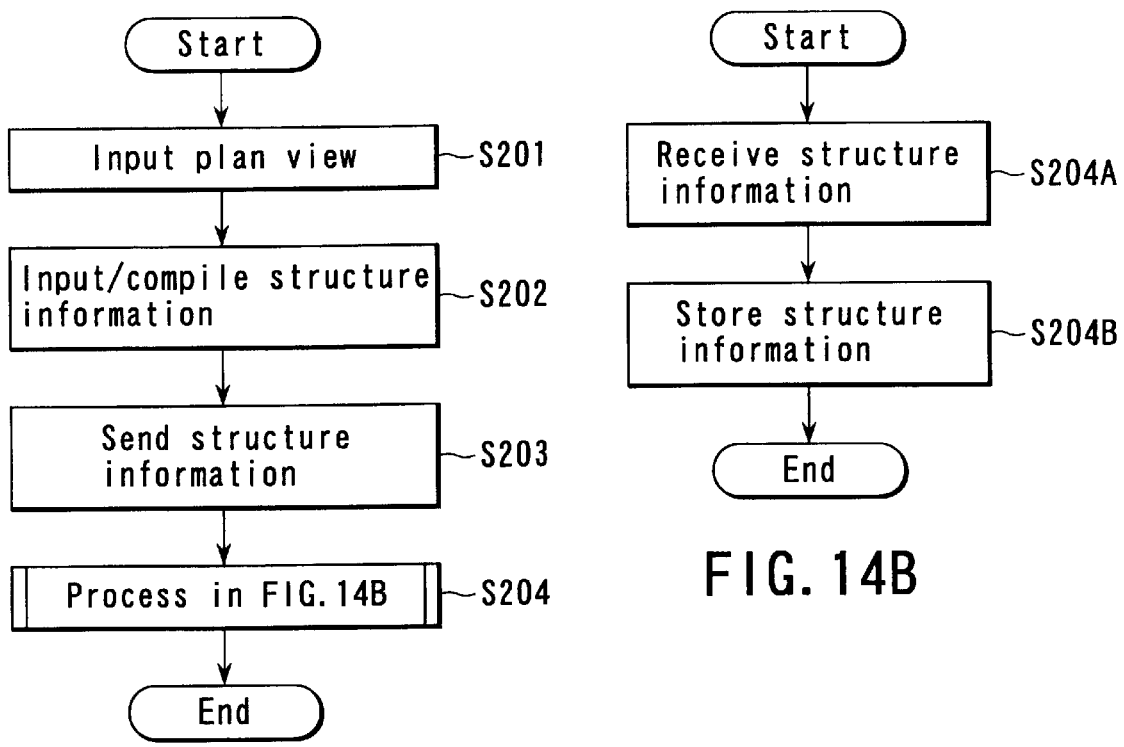
FIG. 14A
FIG. 14B

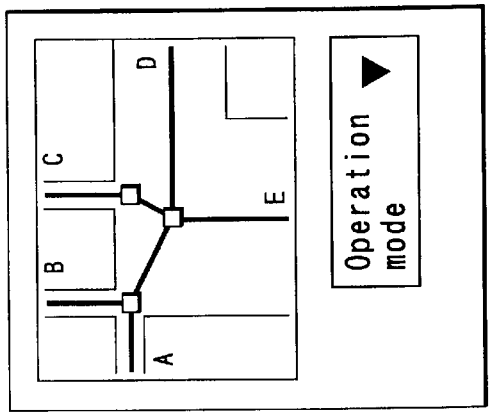
FIG. 20A
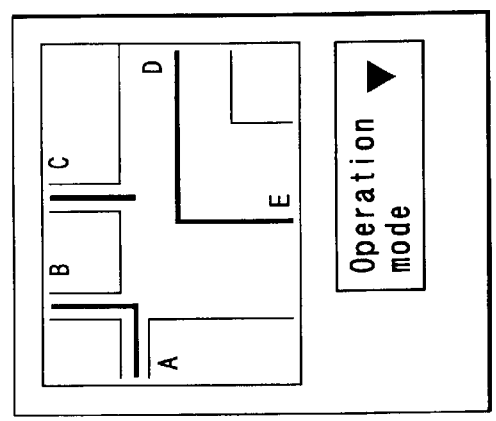
FIG. 20B
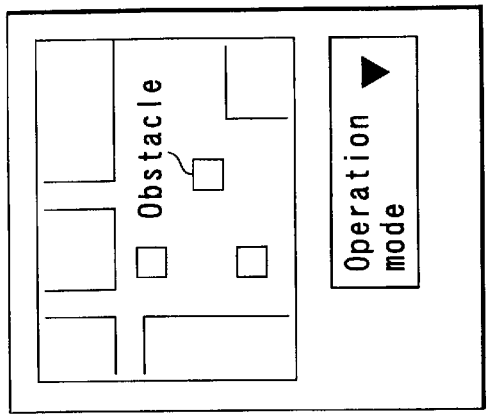
FIG. 20C
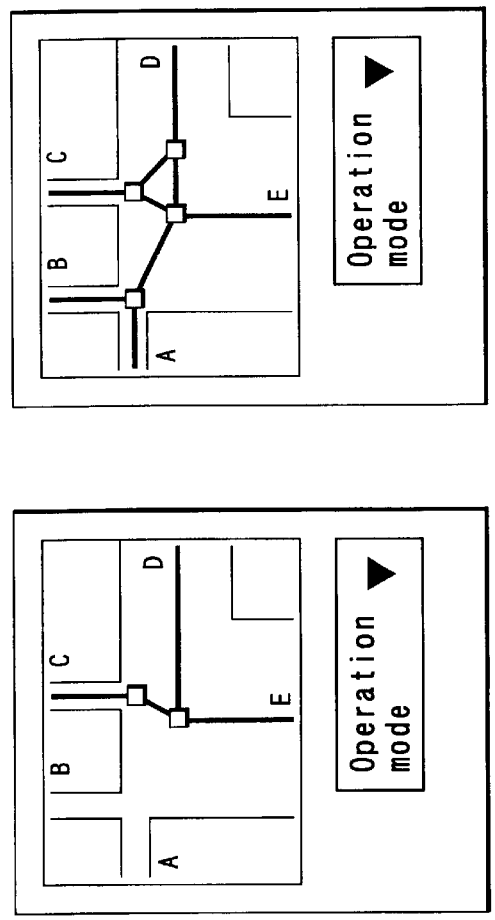
FIG. 20D
FIG. 20E

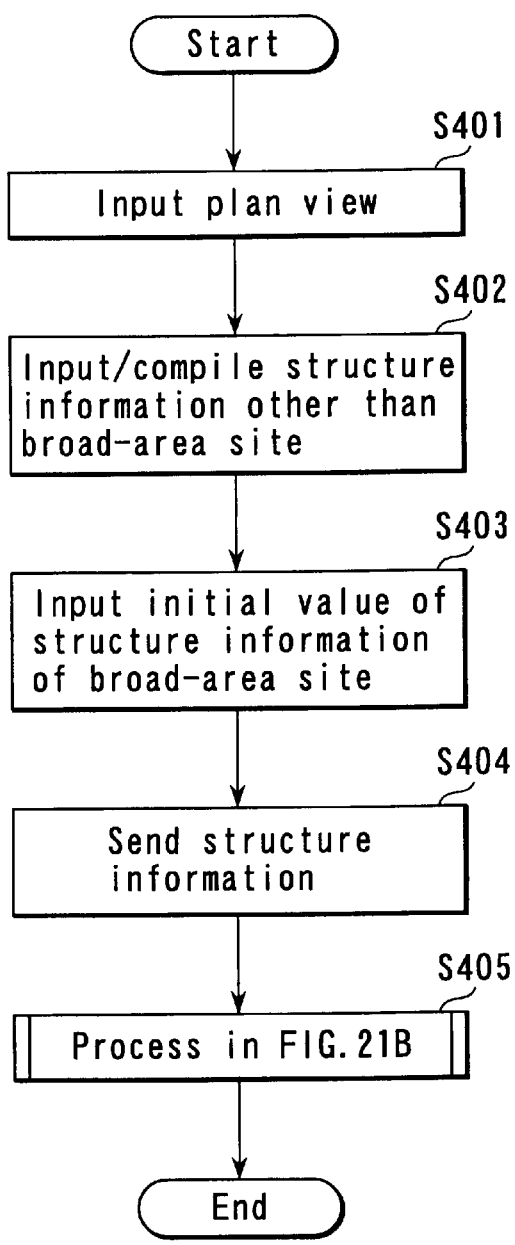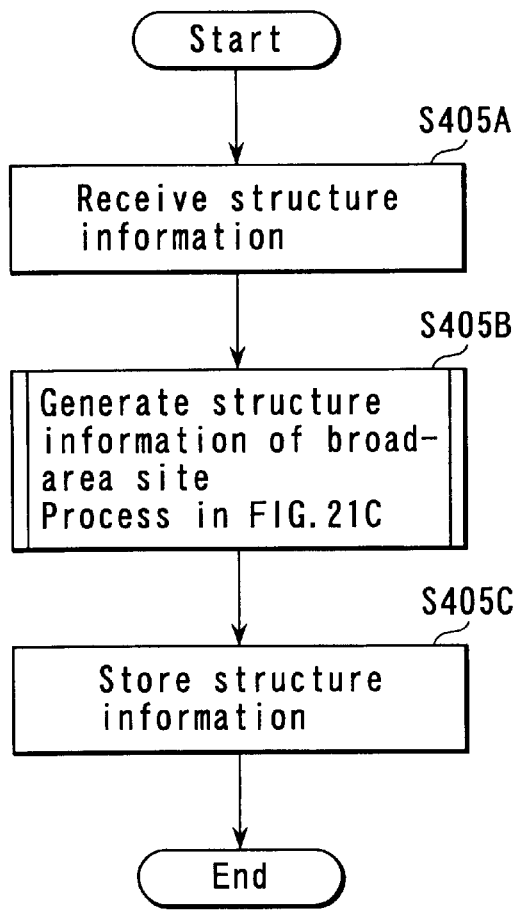
FIG. 21A
FIG. 21B

— Route data
○ Guide point

▭ Stairs
▮▮▮ Ticket gate

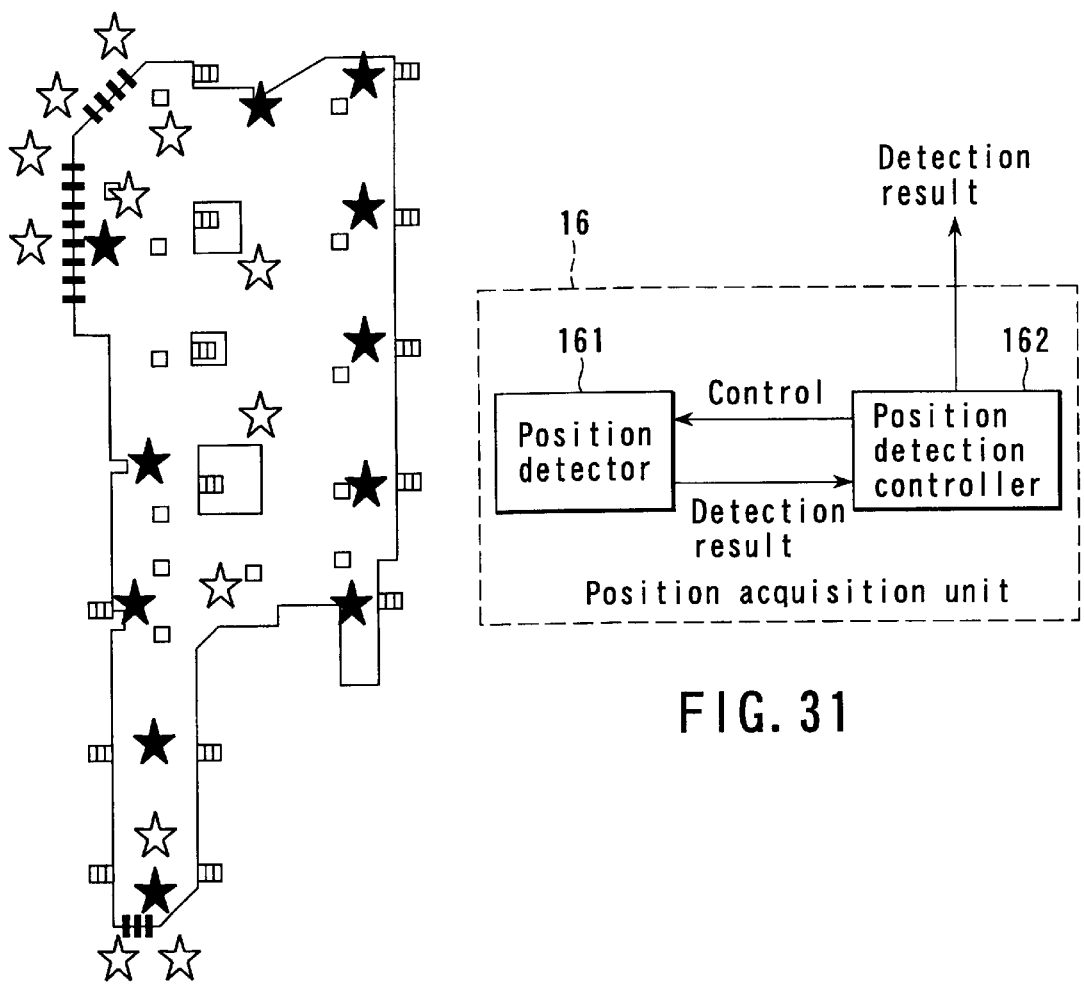
FIG. 30
FIG. 31
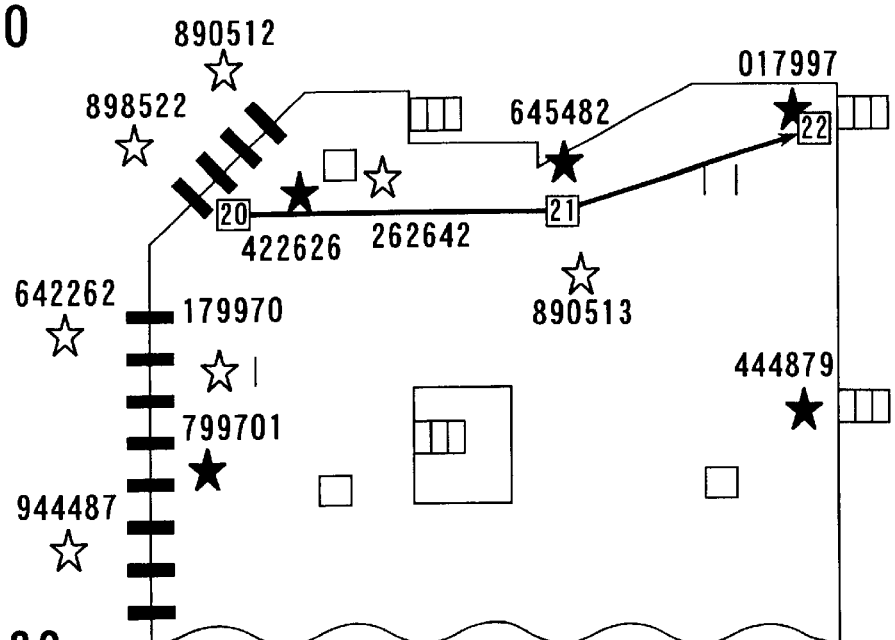
FIG. 32

| Device ID | Type | Location |
|---|---|---|
| 422626 | Position provision | (50, 20, 10) |
| 890512 | Information delivery | (30, 0, 10) |
| 262642 | Information delivery | (70, 15, 10) |
| .. | .. | .. |
| 645482 | Position provision | (110, 15, 10) |

FIG. 33

| Guide point ID | Position providing device ID | Brake device ID | Detection parameter |
|---|---|---|---|
| 20 | 422626 | 799701 | 5 |
| 21 | 645482 | 444879, 799701 | 2 |
| 22 | 017997 | 444879 | 2 |

FIG. 34

| Search condition | Objective class |
|---|---|
| Escalator<br>Elevator<br>Transfer tickt gate<br>Setting machine<br>Ticket-vending machine<br>Restaurant<br>Restroom<br>∙<br>∙<br>∙ | Barrier free<br>Barrier free<br>Transfer<br>Transfer<br>Transfer<br>Meal<br>Restroom<br>∙<br>∙<br>∙ |

FIG. 39

| User condition | Objective class |
|---|---|
| Aged person<br>Family<br>With baggage<br>∙<br>∙<br>∙ | Barrier free, restroom<br>Barrier free, restroom<br>Barrier free<br>∙<br>∙<br>∙ |

FIG. 40

DESTINATION GUIDANCE SYSTEM AND METHOD FOR GENERATING INDIVIDUALLY TAILORED ROUTES WITHIN A COMPLEX STRUCTURE

CROSS-REFERENCE TO RELATED APPLICATIONS

This application is based upon and claims the benefit of priority from the prior Japanese Patent Applications No. 2001-292866, filed Sep. 26, 2001; and No. 2002-052771, filed Feb. 28, 2002, the entire contents of both of which are incorporated herein by reference.

BACKGROUND OF THE INVENTION

1. Field of the Invention

The present invention relates to a destination guidance system for guiding in a building with a complicated structure such as a railway station, underground area, and the like, a destination guidance data acquisition system for acquiring information required for guidance, and the like.

2. Description of the Related Art

In recent years, a route guidance system that guides the user from a place of departure to a destination has become prevalent. As a typical example of such a system, a car navigation system is known. Also, some types of route guidance systems for pedestrians have also been commercially available. For example, a portable terminal with a GPS (Global Positioning System) receiver has been released, and a system that gives route guidance on the basis of position information of the user has been introduced. Furthermore, a system with which the user receives route guidance by explicitly designating a place of departure and destination using a PC, portable terminal, and the like has been introduced.

In such route guidance systems, guidance routes are manually prepared in advance. However, in this system, the guidance range is limited. For this reason, most systems search a pedestrians route network purchased from a map company to automatically generate a guidance route.

In contrast, a system that guides in a building such as a railway station, underground area, or the like is not so prevalent at present. As an example of a system that has been introduced currently, a system that shows train cars that stop near stairs and their doors is available in some railway stations. However, this system can only guide from the platform of a departure station to that of a destination station using text prepared in advance. Therefore, this system cannot automatically generate an individual route in a railway station, that can be provided to each user.

At some subway ticket gates, photos are displayed to show surrounding landscapes at the top of the stairs. Furthermore, a system that gives route guidance by creating a pseudo three-dimensional space by pasting and interpolating some photos of landscapes on the premises of a building or construction is available. However, since each photo is information that indicates only a landscape from a given viewpoint, they cannot provide a global image of the building or route guidance to a destination.

In addition, a service that guides using a map obtained by 2.5-dimensionally deforming a three-dimensional structure of a building is available. However, with this service, guidance routes are manually prepared in advance, and the service does not automatically generate a route in accordance with the place of departure and destination individually designated by the user upon guidance.

In this way, the conventional destination guidance system does not automatically generate each individual route in accordance with the place of departure and destination individually designated by the user upon guidance. Also, the system provides neither a global image of the building nor route guidance to a destination in accordance with the movement of the user. For this reason, such a system is not suitable for transfer guidance in a large-scale railway station where long-distance and shuttle trains cross, guidance of an underground area, and the like. As one of the causes of such difficulty, it is difficult to automatically generate a guidance route since there are innumerable lines along which pedestrians can go in a broad space (to be referred to as a broad-area site hereinafter) such as the vicinity of ticket gates, concourse, and the like in a railway station.

As one of solutions to the aforementioned problems, a method disclosed in Jpn. Pat. Appln. KOKAI Publication No. 2000-298034 can be applied. In this method, a route network with a mesh pattern is formed in a broad-area site, and a route is generated by searching the network. However, with this method, it is difficult to uniquely determine parameters such as components, resolution, and the like of the mesh. For example, quite different routes are generated depending on whether each component of the mesh is defined by a rectangle or a triangle obtained by dividing the rectangle by a diagonal line. On the other hand, when the mesh has a low resolution, the computation volume required for route search decreases, but unnatural detour route may be generated. In contrast, if the mesh has a high resolution, a detour route can be prevented from being generated, but the computation volume increases. In this manner, in the method using the network in the mesh pattern, parameters to be assigned must be determined by trial and error in correspondence with the shape of the broad-area site.

As another solution, a method of generating a route by bending the traveling direction of light rays, that are emitted forward from the current place, toward a destination, and tracing the first vertices that intercept the light rays is available (Pedestrian Information Providing System: Jpn. Pat. Appln. KOKAI Publication No. 10-319839). However, this method cannot generate a plain route for the user since it has no scheme for decreasing the number of turning points included in a route, determining a route that goes by a distinctive landmark, and so forth.

BRIEF SUMMARY OF THE INVENTION

The present invention has been made to solve the aforementioned problems, and has as its object to provide a destination guidance system that automatically generates and presents an individual route in accordance with the place of departure and destination designated by each user, and the like.

The present invention may provide a destination guidance system utilizing a structure on premises of a building, which comprises: a structure information memory which stores structure information corresponding to information pertaining to the structure on the premises of the building, the structure information including a plurality of guide points on the premises of the building, and route data indicating moving routes that connect the plurality of guide points; a guidance information memory which stores first guidance information including landmark data and landscape data concerning a plurality of approach and exit directions to and from each of the guide points; an input unit configured to make a user input a desired place of departure and destination; a recommended route generation unit configured to generate a recommended route, which is recommended upon movement from the place of departure to the destination, by selecting and connecting at least one of the route data stored in the structure information memory; a presentation information generation unit configured to extract second guidance information concerning the plurality of the approach and exit directions to and from at least one guide point, which is present on the recommended route, from the first guidance information in the guidance information memory, and to generate presentation information that contains the second guidance information; and a presentation unit configured to present the presentation information.

The present invention may provide a railway station destination guidance system utilizing a structure on the premises of a railway station, which comprises: a structure information memory which stores structure information corresponding to information pertaining to the structure on the premises of the railway station, the structure information including a plurality of guide points on the premises of the railway station, and route data indicating moving routes that connect the plurality of guide points; a guidance information memory which stores guidance information, the guidance information including landmark data and landscape data which concerns a plurality of approach and exit directions to and from each of the guide points; an input unit configured to make a user input a desired place of departure and destination; a recommended route generation unit configured to generate a recommended route, which is recommended upon movement from the place of departure to the destination, by selecting and connecting the route data stored in the structure information memory; a presentation information generation unit configured to extract second guidance information concerning the plurality of the approach and exit directions to and from at least one of the guide points, which is present on the recommended route, from the first guidance information in the guidance information memory, and to generate presentation information that contains the second guidance information; and a presentation unit configured to present the presentation information.

The present invention may provide a server apparatus which generates information pertaining to guidance on the premises of a building and sends the information to a user terminal and utilizes a structure on the premises of a building, comprising: a communication device configured to communicate with the user terminal; a structure information memory which stores structure information corresponding to information pertaining to the structure on the premises of the building, the structure information including a plurality of guide points on the premises of the building and route data indicating moving routes that connect the plurality of guide points; a guidance information memory which stores first guidance information, which includes landmark data and landscape data concerning a plurality of approach and exit directions to and from each of the guide points; a recommended route generation unit configured to generate a recommended route, which is recommended upon movement from a place of departure to a destination input from the user terminal, by selecting and connecting at least one of the route data stored in the structure information memory; and a presentation information generation unit configured to extract second guidance information concerning the plurality of the approach and exit directions to and from at least one of the guide point, which is present on the recommended route, from the first guidance information in the guidance information memory, and to generate presentation information which contains the second guidance information and is sent to the user terminal via the communication device.

The present invention may provide a user terminal communicating with a server apparatus which generates information pertaining to guidance on a premises of a building, comprising: an input unit configured to input a desired place of departure and destination on the premises of the building; a communication device configured to send the place of departure and destination to the server apparatus, and to receive the information pertaining to guidance on the premises of the building from the server apparatus; and a presentation unit configured to present the information pertaining to guidance on the premises of the building.

The present invention may provide a destination guidance method comprising: storing structure information corresponding to information pertaining to a structure on the premises of a building, the structure information including a plurality of guide points on the premises of the building, and route data indicating moving routes that connect the plurality of guide points in a guidance information memory; storing first guidance information, which includes landmark data and landscape data concerning a plurality of approach and exit directions to and from each of the guide points; making a user input a desired place of departure and destination; generating a recommended route, which is recommended upon movement from the place of departure to the destination, by selecting and connecting at least one of the stored route data; extracting second guidance information concerning the plurality of the approach and exit directions to and from at least one of the guide point, which is present on the recommended route, from the guidance information in the guidance information memory; generating presentation information that contains the guidance information; and presenting the presentation information.

The present invention may provide a computer readable memory storing a guidance program, the guidance program comprising: first store means for causing a computer to store structure information corresponding to information pertaining to a structure on the premises of a building, the structure information including a plurality of guide points on the premises of the building and route data indicating moving routes that connect the plurality of guide points; second store means for causing a computer to store guidance information, which includes landmark data and landscape data for a plurality of approach and exit directions to and from each of the guide points in a guidance information memory; first generation means for causing a computer to generate a recommended route, which is recommended upon movement from a place of departure to a destination which are input from a user terminal, by selecting and connecting at least one of the stored route data; second means for causing a computer to extract guidance information concerning the plurality of the approach and exit directions to and from at least one of the guide points, which is present on the recommended route, from the guidance information memory, and for generating presentation information that contains the guidance information; and means for causing a computer to send the presentation information to the user terminal via a communication device.

The present invention may provide a destination guidance data acquisition system which comprises: a presentation unit configured to present a structural drawing on the premises of a building; a structure information generation unit configured to generate structure information by designating a plurality of guide points on the premises of the building and route data indicating moving routes that connect the plurality of guide points on the structural drawing on the premises of the building; a structure information memory which stores the structure information; a guidance information generation unit configured to generate guidance information by inputting landmark data or landscape data, which serve as landmarks in a plurality of line-of-sight directions upon approaching or existing from each of the plurality of guide points of the structure information; and a guidance information memory which stores the guide information for each of the guide points.

The present invention may provide a destination guidance data acquisition terminal which acquires information pertaining to guidance on the premises of a building, and sends the acquired information to a server, comprising: a presentation unit configured to present a structural drawing of the premises of the building; a structure information generation unit configured to generate structure information by designating a plurality of guide points on the premises of the building and route data indicating moving routes that connect the plurality of guide points on the presented structural drawing of the premises of the building; a guidance information generation unit configured to generate guidance information by inputting landmark data or landscape data, which serve as landmarks in a plurality of line-of-sight directions upon approaching or existing from each of the plurality of guide points of the structure information; and a communication device configured to send the structure information and the guidance information for each guide point to the server.

The present invention may provide a destination guidance data acquisition server which acquires data pertaining to guidance on the premises of a building in accordance with an input from a destination guidance data acquisition terminal, comprising: a communication device configured to communicate with the destination guidance data acquisition terminal; a structure information memory which stores structure information corresponding to information received by said communication device, the structure information being generated by designating a plurality of guide points, and route data indicating moving routes that connect the plurality of guide points on a structural drawing of the premises of the building; and a guidance information memory which stores, for each guide point, guidance information corresponding to information received by said communication device, the guidance information being generated by inputting landmark data or landscape data which serve as landmarks in a plurality of line-of-sight directions upon approaching or existing from each of the plurality of guide points of the structure information.

The present invention may provide a destination guidance data acquisition method which comprises: generating structure information by designating a plurality of guide points on the premises of the building and route data indicating moving routes that connect the plurality of guide points on a structural drawing of the premises of a building; storing the structure information; generating guidance information by inputting landmark data or landscape data, which serve as landmarks in a plurality of line-of-sight directions upon approaching or existing from each of the plurality of guide points of the structure information; storing the guide information for each guide point; and presenting at least one of the structural drawing of the premises of the building, the structure information, and the guidance information.

The present invention may provide a computer readable memory storing a guidance program, the guidance program which comprises: means for causing a computer to present a structural drawing of premises of a building; first generation means for causing a computer to generate structure information by designating a plurality of guide points on the premises of the building and route data indicating moving routes that connect the plurality of guide points on the presented structural drawing of the premises of the building; second generation means for causing a computer to generate guidance information by inputting landmark data or landscape data, which serve as landmarks in a plurality of line-of-sight directions upon approaching or existing from each of the plurality of guide points of the structure information; and means for causing a computer to send the structure information and the guidance information for each guide point to the server.

BRIEF DESCRIPTION OF THE SEVERAL VIEWS OF THE DRAWING

FIGS. 2A and 2B are flowcharts showing the flow of processes in the first embodiment;

FIGS. 3A to 3F show examples of an input window of the place of departure and destination at a user terminal in the first embodiment;

FIG. 6 shows an example of guidance information in the first embodiment;

FIG. 8 shows an example of presentation information in the first embodiment;

FIG. 13 is a flowchart showing the flow of processes in the second embodiment;

FIGS. 14A and 14B are flowcharts showing the flow of processes in the structure information compile step in the second embodiment;

FIGS. 20A to 20E are views for explaining the structure information compile step in the second embodiment;

FIGS. 21A to 21C are flowcharts showing the flow of processes in the structure information compile step in the third embodiment;

FIG. 30 shows a layout example of wireless devices in the eighth embodiment;

FIG. 31 is a block diagram showing the arrangement of a position acquisition unit in the eighth embodiment;

FIG. 32 shows a guidance route and a layout example of wireless devices in the eighth embodiment;

FIG. 33 shows an example of layout information of wireless devices in the eighth embodiment;

FIG. 34 shows an example of position detection control information in the eighth embodiment;

FIG. 39 shows an example of a correspondence table between the search conditions and objective classes in the ninth embodiment;

FIG. 40 shows an example of a correspondence table between the user conditions and objective classes in the ninth embodiment.

DETAILED DESCRIPTION OF THE INVENTION

The first to ninth embodiments of the present invention will be described hereinafter with reference to the accompanying drawings.
(First Embodiment)

Figure 1:
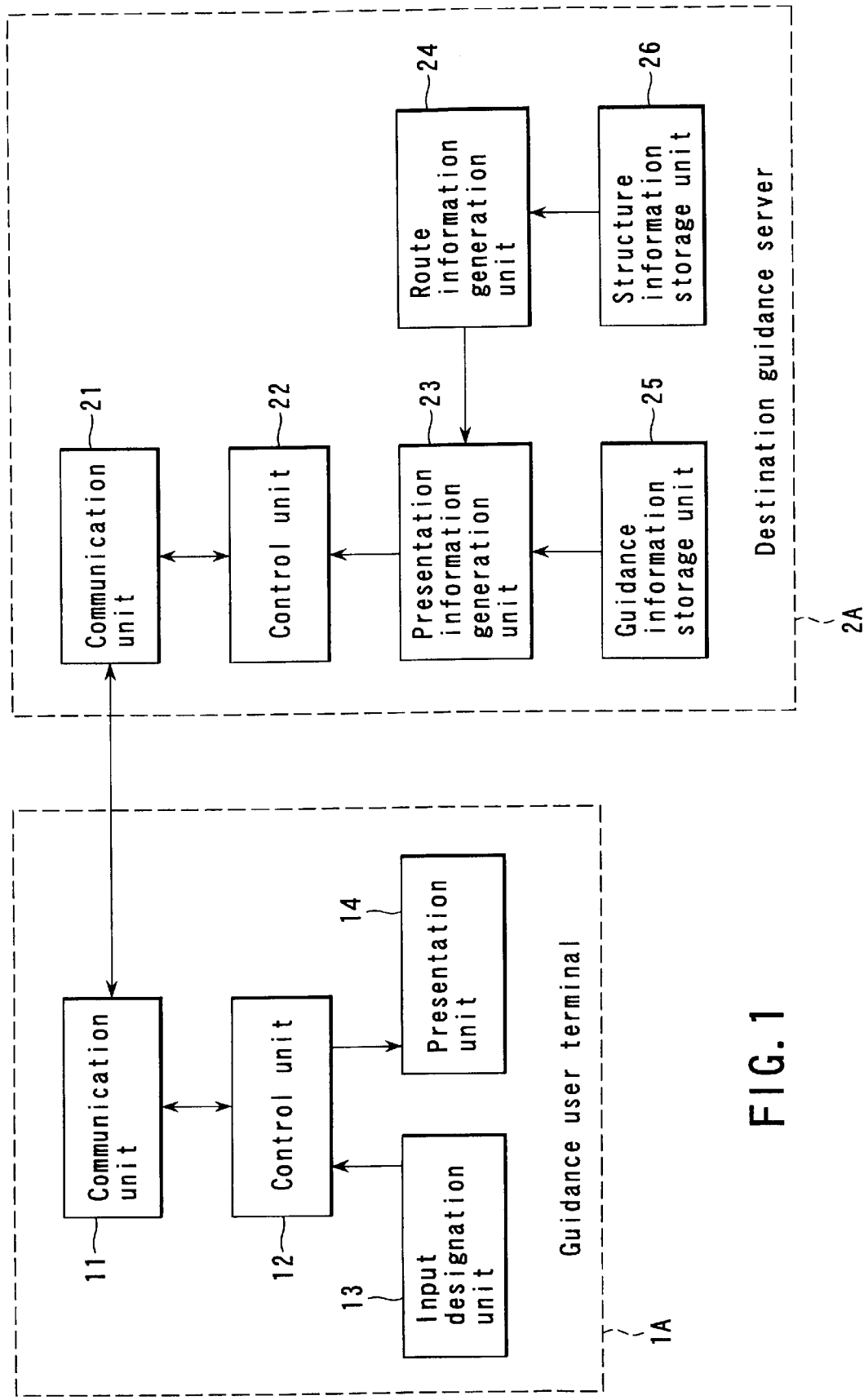
FIG. 1 is a block diagram showing the overall arrangement of a destination guidance system according to the first embodiment.

The first embodiment of the present invention will be described first. FIG. 1 is a block diagram of a destination guidance system according to the first embodiment. This destination guidance system roughly comprises a user terminal 1A carried by a pedestrian, and a destination guidance server 2A equipped by a destination guidance service provider. In the following description, assume that the destination guidance system is applied to a railway station to give a specific explanation.

The user terminal 1A is a compact computer such as a PDA (Personal Digital Assistant), portable phone, or the like, which can be easily carried by a pedestrian. The user terminal 1A has a communication unit 11, control unit 12, input unit 13, and presentation unit 14.

The communication unit 11 is a device for exchanging presentation information and input information (to be described later) with the destination guidance server 2A. The control unit 12 controls the operations of respective building components. The input unit 13 comprises a touch pen, operation keys such as buttons, mouse, microphone for voice input, and the like, and is used to input the place of departure and destination of destination guidance, and to switch presentation information presented on the presentation unit 14. The presentation unit 14 comprises a display or loudspeaker, and presents presentation information received from the destination guidance server 2A via the communication unit 11.

The destination guidance server 2A is a high-performance computer equipped by the destination guidance service provider, and has a communication unit 21, control unit 22, presentation information generation unit 23, route information generation unit 24, guidance information storage unit 25, and structure information storage unit 26.

The communication unit 21 is a device for exchanging presentation information and input information (to be described later) with the user terminal 1A. The control unit 22 reads out guidance information from the guidance information storage unit 24 in accordance with an approach or exit direction to a guide point of a generated route, and controls the operations of respective system components. The presentation information generation unit 23 generates presentation information (to be described later) that is easy for the user to understand. The route information generation unit 24 stores guidance information that serves as a landmark at a point to be guided (to be referred to as a guide point hereinafter). The structure information storage unit 26 stores structure information as information of the three-dimensional structure of the building.

FIGS. 2A and 2B are flowcharts showing the processing sequence in the destination guidance system. The process in step S103 (i.e., the processes shown in FIG. 2B) is executed by the destination guidance server 2A. Other processes are executed by the user terminal 1A.

At the user terminal 1A, the user inputs the place of departure and destination of destination guidance using the input unit 13 (step S101). FIGS. 3A to 3F show an example of a user interface used upon executing this input process.

As an initial window, a window that includes four input forms, two search buttons, one reset button, and a [destination guidance GO] button used to display guidance, as shown in FIG. 3A, is displayed. On this window, the user inputs a keyword associated with the place of departure, e.g., "S station, T line", as shown in FIG. 3B. When the user then designates the search button, a list of places in the station associated with the input keyword is displayed, as shown in FIG. 3C (in FIG. 3C, seven candidates such as "T line, south exit" and the like are displayed with respect to the designated keyword "S station, T line"). The user can select and designate the place of departure from one of these candidates, e.g., "platform No. 2 (for A)" as his or her current location.

The user can designate the destination in the same manner as the place of departure. For example, when the user inputs "S station, Y line", as shown in FIG. 3D, and designates the search button, a list of places in the station associated with the keyword is displayed, as shown in FIG. 3E. The user can select and designate one of these candidates as in destination of the place of departure. Upon completion of input of the place of departure and destination, as shown in FIG. 3F, when the user designates the [destination guidance GO] button at the lower right position of the window, the next process starts.

Note that the user interface used to designate the place of departure and destination is not limited to the example shown in FIGS. 3A to 3F. As other examples, a method of designating the place of departure and destination using type-dependent hierarchical menus such as a platform, exit, ticket gate, ticket booth, restroom, and the like, a method of directly designating a position by displaying the plan view of the station, an input method using voice, and the like may be used.

Figure 11:
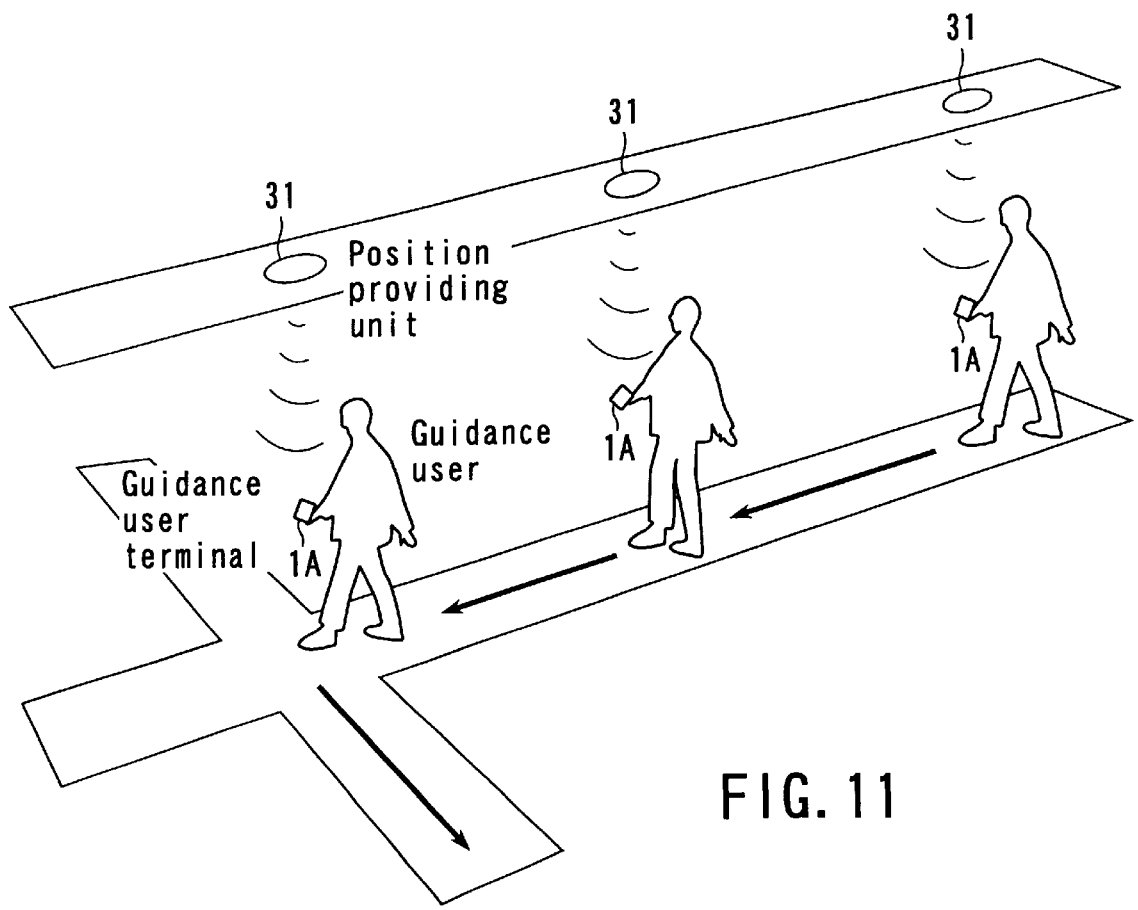
FIG. 11 shows a state wherein the destination guidance presentation window in the first embodiment is automatically switched.

In the example shown in FIGS. 3A to 3F, the user directly inputs the place of departure and destination. By contrast, the place of departure may be automatically designated using near-distance wireless communications such as Bluetooth™. In such a case, position data can be acquired from a position providing unit 31 (see FIG. 11) which is set in advance at a branch point in the building or at an entrance of a room. Furthermore, when this system links with an existing transfer service, the place of departure and destination can be automatically determined using the transfer guidance result.

The description will revert to the flowchart of FIG. 2A. The information associated with the input place of departure and destination is sent to the destination guidance server 2A via the communication unit 11 (step S102). The destination guidance server 2A receives the information associated with the place of departure and destination, and executes the processes shown in FIG. 2B (step S103).

The destination guidance server 2A receives the place of departure and destination sent from the user terminal 1A by the communication unit 21 (step S103A). The route information generation unit 24 generates optimal route information on the basis of the structure information stored in the structure information storage unit 26 (step S103B).

Note that the structure information consists of route data and guide point data, and represents the structure on the premises of the building or construction. The guide point data indicates positions corresponding to a plurality of places in the building, which are to be presented to the user as a guidance. For example, a guide point indicates a position corresponding to a place such as a turning point of a contour line, a foyer of stairs, ticket gates, an entrance of room, an obstacle, and the like, which can be used as candidates of the place of departure and destination of destination guidance. Also, the route data indicates a line segment corresponding to a route which connects different guide point data. Therefore, the route data is divided by guide point data or branches at guide point data.

Figures 4A, 4B, 4C:
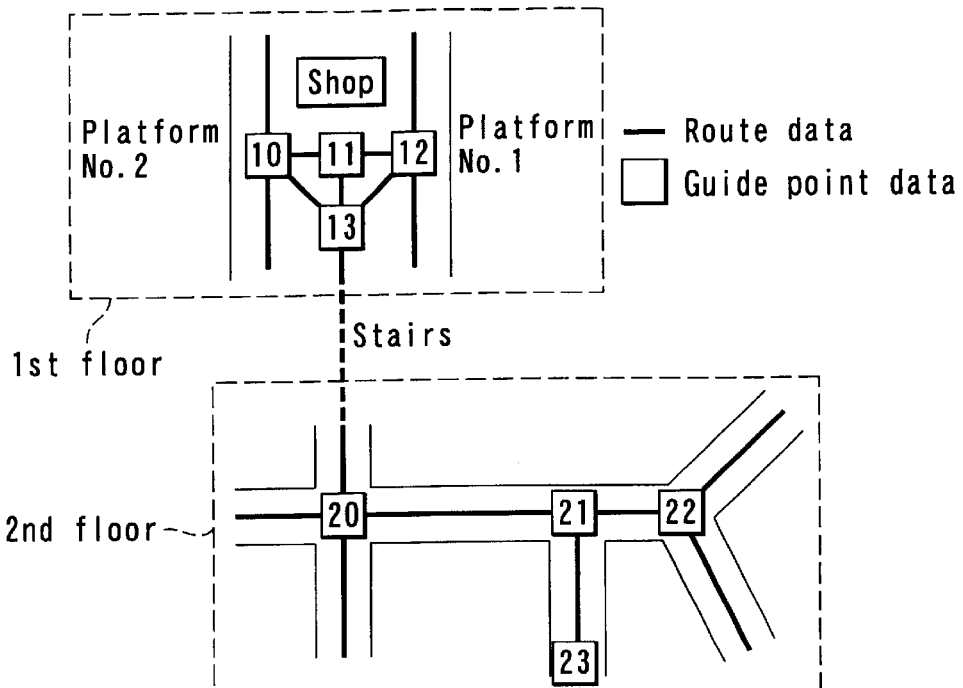
FIGS. 4A to 4C show an example of structure information in the first embodiment.

Note that the route data and guide point data that form the structure information are stored in the structure information storage unit 26 respectively in formats shown in, e.g., FIGS. 4B and 4C.

Figures 5A, 5B, 5C:
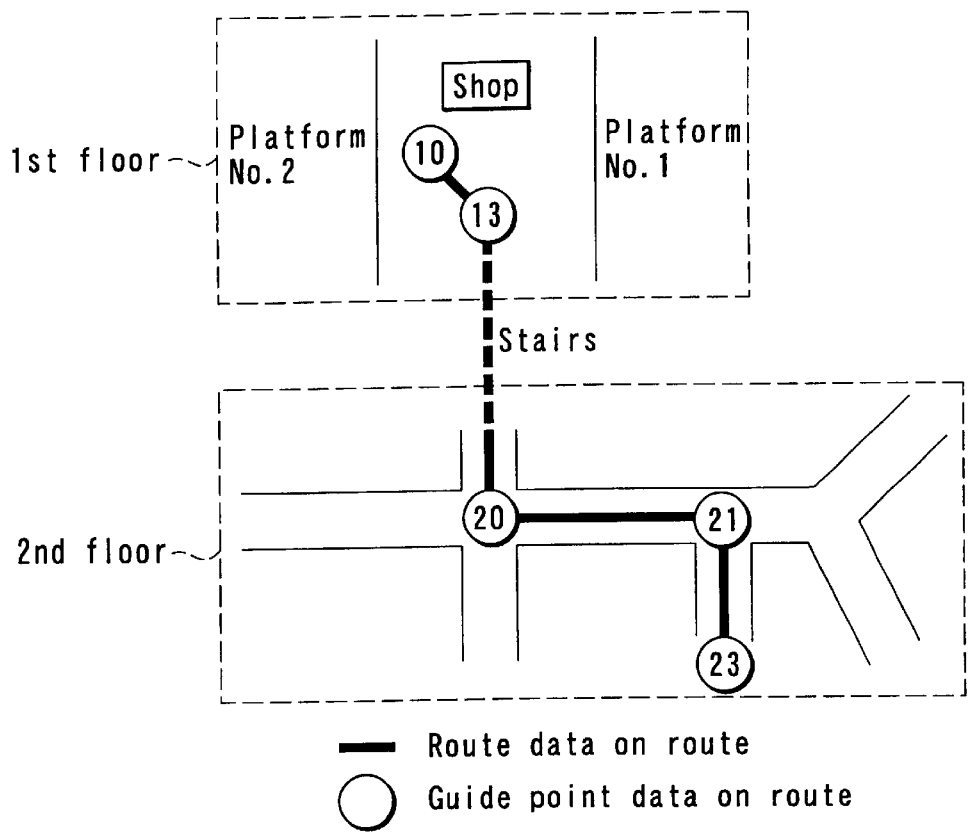
FIGS. 5A to 5C show an example of route information in the first embodiment.

The route information generation unit 24 extracts a portion corresponding to an optimal route that connects the place of departure and destination from the structure information. This process is preferably implemented using a Dijkstra's algorithm, which is known as a method of obtaining an optimal route on the network. As a cost of this Dijkstra's algorithm, the distance of a route is preferably used. In this manner, route information shown in FIG. 5A is generated. Assume that an example of a route, which has guide point No. 23 as a place of departure, goes along guide point Nos. 21, 20, and 13, and has guide point No. 10 as a destination is generated. In case of this example, FIGS. 5B and 5C are respectively extracted as route information from the route data and guide point data shown in FIGS. 4B and 4C.

The presentation information generation unit 23 extracts guidance information corresponding to the generated route information from the guidance information storage unit 25. Note that the guidance information indicates landmark data or landscape data which serve as landmarks at respective guide points for all the approach and exit directions.

For example, guidance information corresponding to the route information in FIGS. 5B and 5C is as shown in FIG. 6. In this information, since guide point No. 23 as the place of departure has only the exit direction, no information associated with the approach direction is required. Likewise, guide point No. 10 as the destination does not require any information associated with the exit direction.

Figures 7A, 7B:
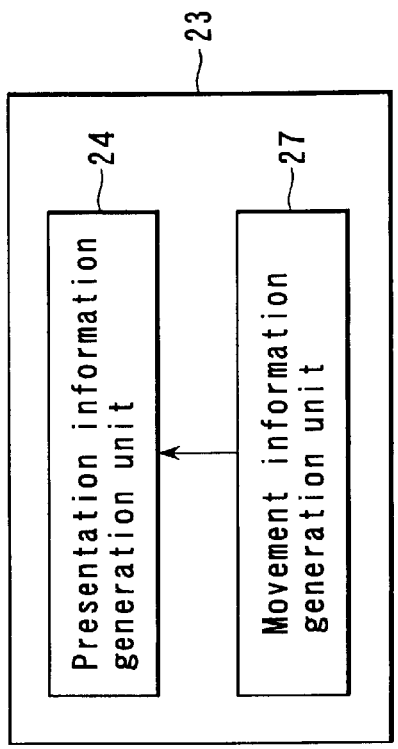
FIGS. 7A and 7B show the arrangement of a movement information generation unit and an example of movement information in the first embodiment.

Furthermore, in the process for extracting this guidance information, a movement information generator 27 (see FIG. 7A) included in the presentation information generation unit 23 generates movement information from the route information. Note that the movement information represents three-dimensional moving directions upon approaching and exiting to and from each guide point, and the next direction to go for the user. For example, movement information generated from the route information shown in FIGS. 5B and 5C is as shown in FIG. 7B.

The guidance information (see FIG. 6) and movement information (see FIG. 7B) generated in this way are combined with the generated route information (FIGS. 5B and 5C) as presentation information shown in FIG. 8 (step S103C). This presentation information is expressed by landmark data and landscape data corresponding to the approach and exit directions at respective guide points and next directions to go. This presentation information is converted into a format that the user can visibly understand, and is sent to the user terminal 1A via the communication unit 21 (step S103D).

On the other hand, the user terminal 1A receives the presentation information sent from the destination guidance server 2A (step S104). Then, the presentation information corresponding to the current location of the user is presented using windows shown in FIGS. 9A to 9F (step S105).

FIGS. 9A to 9F present two-dimensional route guidance by displaying the route information and landmark information on a lower portion of each window, and present three-dimensional route guide by displaying landscape data on an upper portion of each window. In the landscape data, the current location and moving direction of the user are indicated by the position and direction of a two-dimensional arrow. For example, the window shown in FIG. 9A guides the user to go forward along a straight path. The window shown in FIG. 9B guides the user to turn to the left on a T-shaped path. The window shown in FIG. 9C guides the user to go forward along a straight path after a left turn.

Figure 9C:
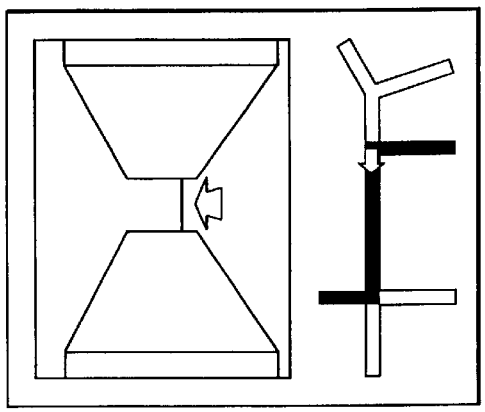
FIGS. 9A to 9F show examples of a destination guidance presentation window at the user terminal in the first embodiment.
Figure 9F:
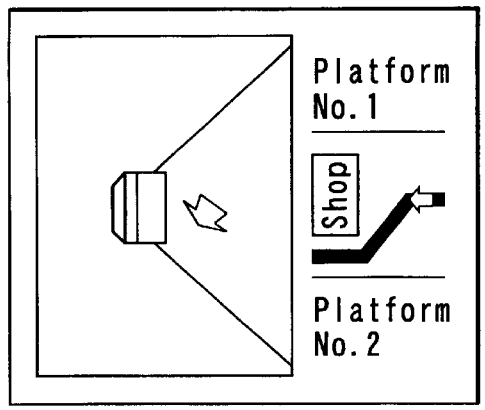
Figure 9B:
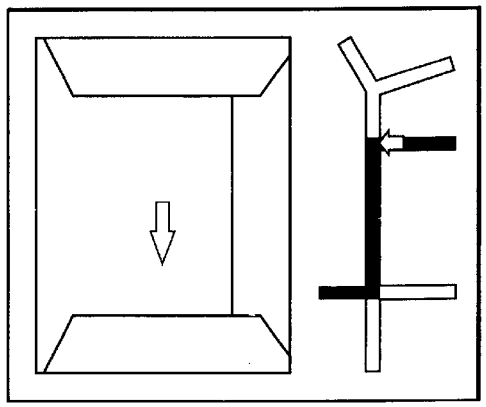
Figure 9E:
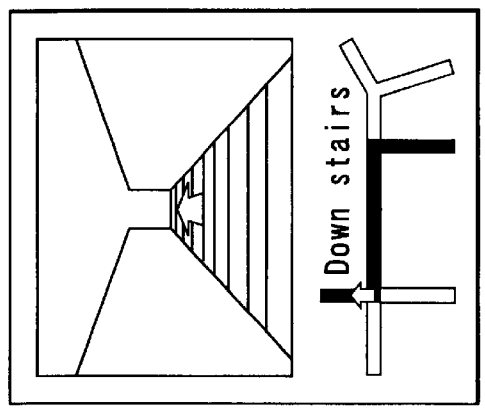
Figure 9A:
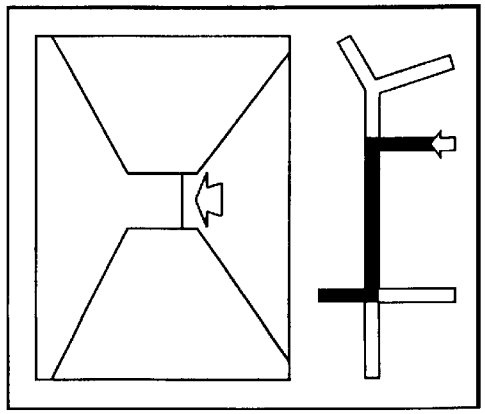
Figure 9D:
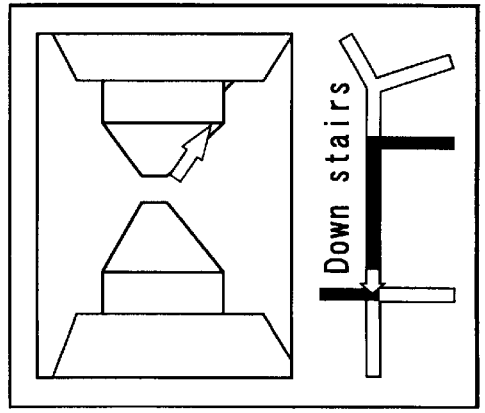

The window shown in FIG. 9D informs the user of the presence of down stairs after a right turn by displaying a right downward arrow on the landscape data. The window shown in FIG. 9E guides the user to go down the stairs after right turn. The window shown in FIG. 9F guides the user to go toward the left track of the platform after the down stairs.

Figure 10:
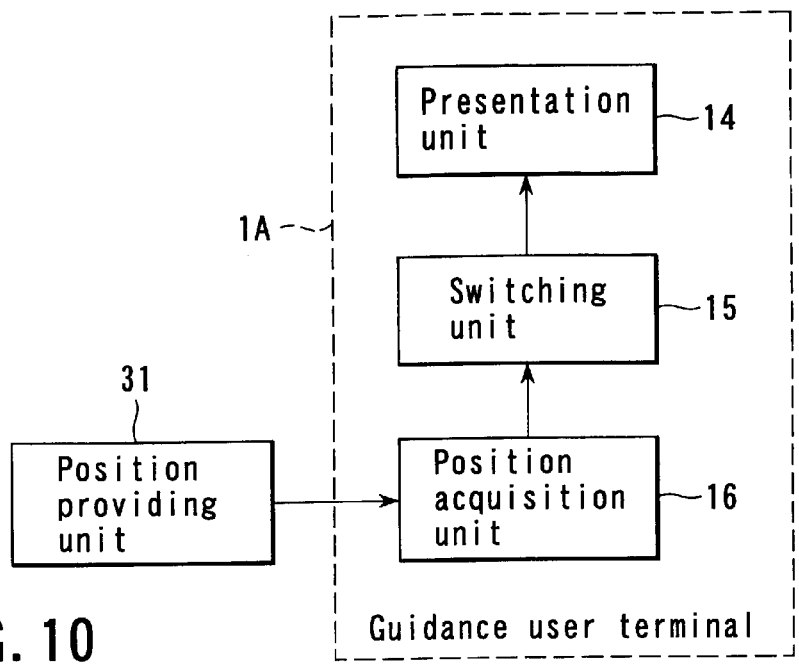
FIG. 10 is a diagram showing the arrangement of a switching unit, position acquisition unit, and position providing unit in the first embodiment.

In this manner, this embodiment two-dimensionally presents the route, landmark, and current moving direction, and can ease the user's apprehension about "where am I?". In addition, this embodiment presents the three-dimensional landscape and the next direction to go, and can ease the user's apprehension about "which way must I go?". Note that the windows may be switched manually by the user using the operation keys or the like of the input unit 13 of the user terminal 1A, or position data may be sent from the position providing unit 31 set at the nearest guide point to the position acquisition unit 16 of the presentation unit 14, as shown in FIG. 10, and the switching unit 15 may automatically switch the presentation contents on the presentation unit 14 in accordance with that position data.

The position providing unit 31 and position acquisition unit 16 can exchange data using near-distance wireless communications such as Bluetooth™. The user can use such automatic switching system of the presentation contents, as shown in, e.g., FIG. 11. The user can reach the destination without operating the user terminal 1A.

Figure 17:
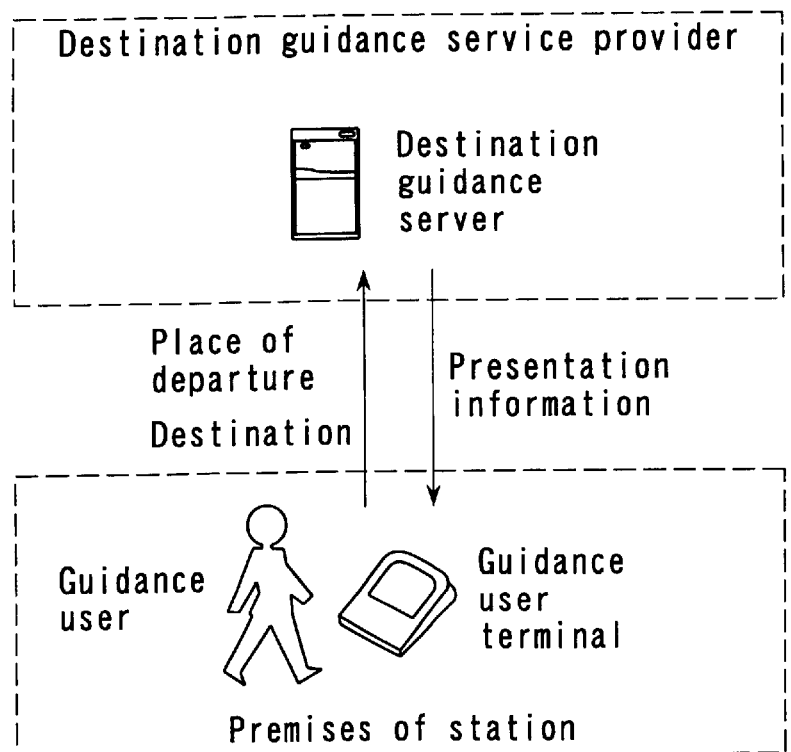
FIG. 17 shows the overall arrangement of a destination guidance service in each embodiment.

In this manner, according to the destination guidance system of this embodiment, since the entire three-dimensional structure of the building can be recognized, and landmark and landscape information, which can serve as a landmark for recognizing the current location can be provided, a destination guidance service (FIG. 17) that is easy for the user to understand can be implemented.

(Second Embodiment)

The second embodiment of the present invention will be described below. A destination guidance data acquisition system according to the second embodiment acquires structure information and guidance information that pertain to an arbitrary building or construction. Respective pieces of information acquired by this system are provided to the destination guidance system described in the first embodiment, and are used to practice the aforementioned guidance service.

Figure 12:
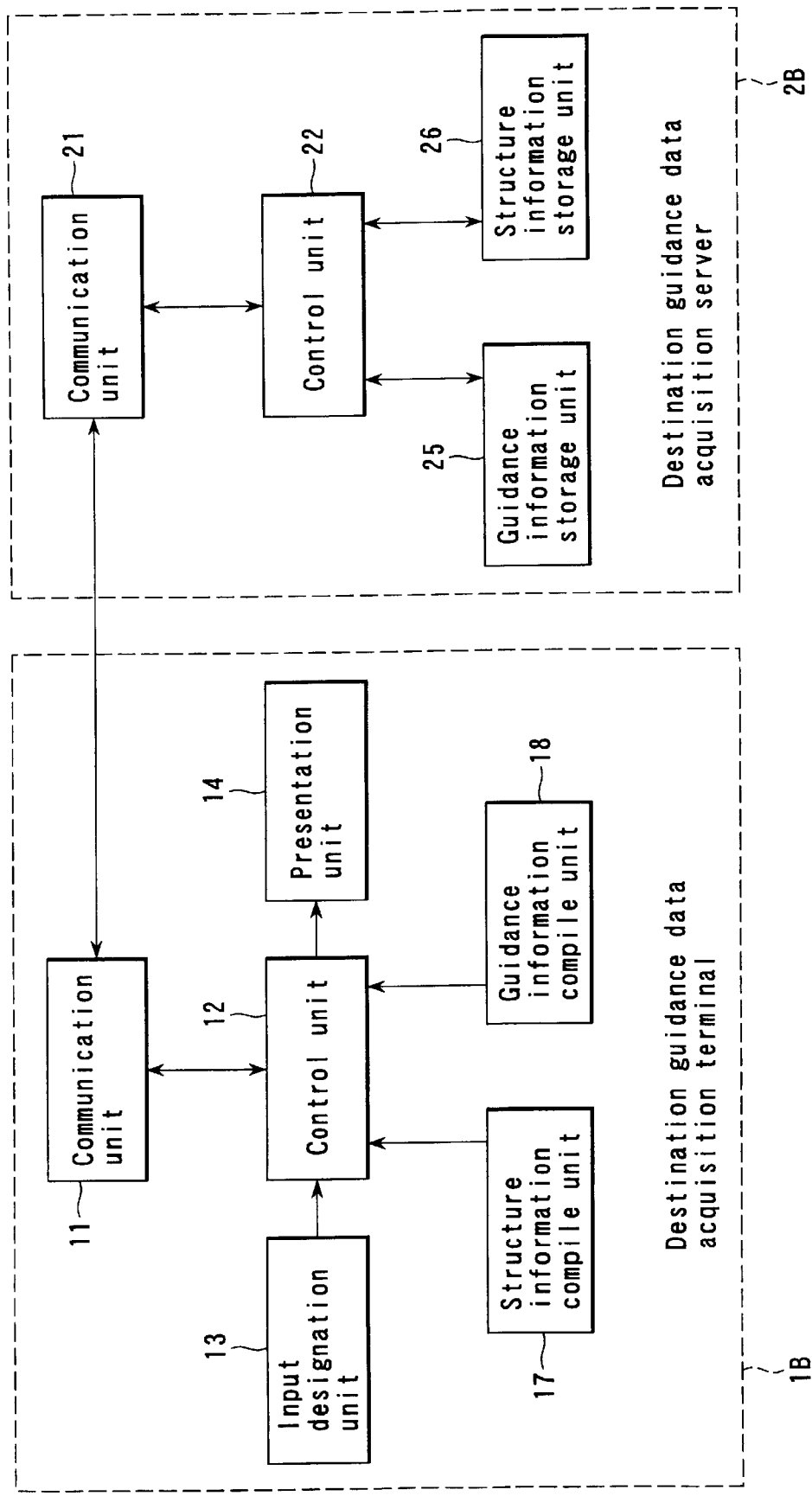
FIG. 12 is a block diagram showing the overall arrangement of a destination guidance data acquisition apparatus according to the second embodiment.

FIG. 12 is a block diagram showing the overall arrangement of a destination guidance data acquisition system according to the second embodiment.

This destination guidance data acquisition system roughly comprises a destination guidance data acquisition terminal 1B carried by an investigator of an information investigation agent, and a destination guidance data acquisition server 2B which is equipped by the information investigation agent. In the following description, assume that the destination guidance data acquisition system is applied to a station as in the first embodiment.

The destination guidance data acquisition terminal 1B is a compact computer such as a PDA (Personal Digital Assistant), portable phone, or the like, which can be easily carried by a pedestrian. The destination guidance data acquisition terminal 1B has a control unit 12, input unit 13, presentation unit 14, structure information compile unit 17, and guidance information compile unit 18.

The input unit 13 comprises a touch pen, operation keys such as buttons, mouse, microphone for voice input, and the like, and is used to input the place of departure and destination of destination guidance, and to switch presentation information presented on the presentation unit 14. The presentation unit 14 comprises a display or loudspeaker, and presents presentation information received from the destination guidance data acquisition server 2B via a communication unit 11. Also, the presentation unit 14 presents structure information and guidance information to be compiled.

The destination guidance data acquisition server 2B is a computer equipped by the information investigation agent, and comprises a structure information storage unit for storing structure information that indicates correspondence between route data and guide point data, a guidance information storage unit 25 for storing guidance information as information that represents landmark data or landscape data serving as landmarks at guide points for all approach and exit directions, a communication unit 21 used to communicate with the destination guidance data acquisition terminal 1B, and a control unit 22 for controlling the operations of the respective means.

FIG. 13 is a flowchart showing the process in the destination guidance data acquisition system. As can be seen from FIG. 13, the destination guidance data acquisition process roughly includes two processes, i.e., the structure information compile step (step S200) and the guidance information compile step (step S300). FIGS. 14A and 14B are flowcharts of the structure information compile step. FIG. 14A shows the processing sequence of the destination guidance data acquisition terminal 1B, and FIG. 14B shows that of the destination guidance data acquisition server 2B.

Figure 15A:
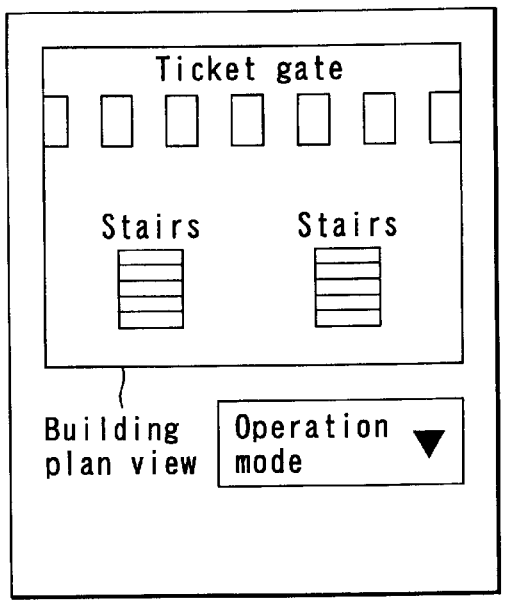
FIGS. 15A to 15D show examples of a structure information compile window on a destination guidance data acquisition terminal in the second embodiment.

The user inputs a plan view of the building from the input unit 13 to the destination guidance data acquisition terminal 1B (step S201). The plan view of the building may be read out from map data of the station, which is prepared in advance. For example, the presentation unit 14 of the destination guidance data acquisition terminal 1B displays the plan view and an operation mode menu using windows shown in FIGS. 15A and 15B.

Figure 15B:
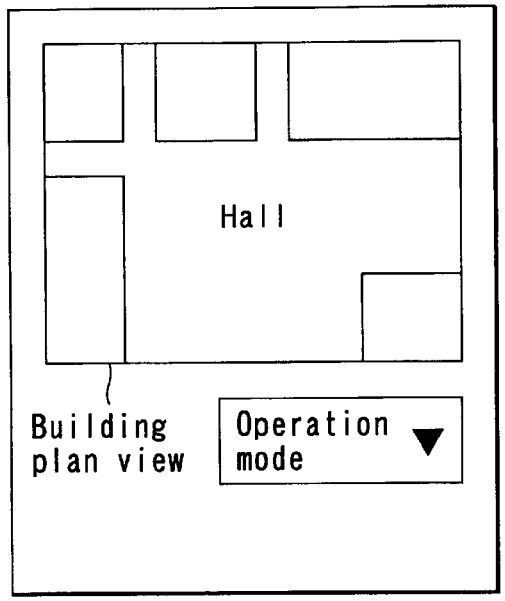
Figure 15C:
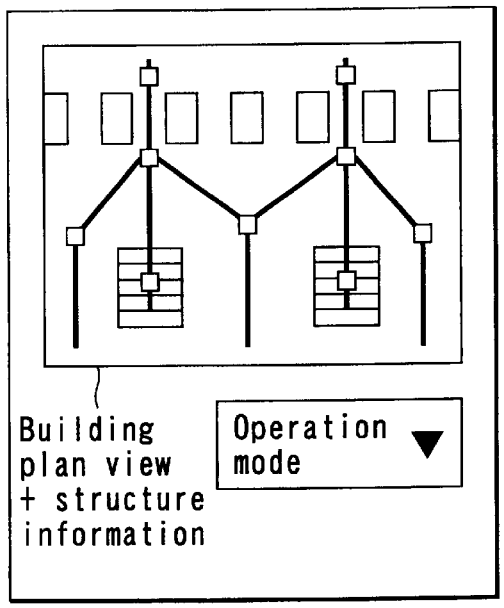

The structure information compile unit 17 inputs and compiles structure information (step S202). More specifically, the user selects an appropriate operation mode from the operation mode menu, and overwrites route data and guide point data on the plan view using a touch pen or the like. During the compile process of the structure information, the presentation unit 14 presents the compile state of route data and guide point data, as shown in FIGS. 15C (15D), and the presentation contents are updated every time a new compile operation is made.

Note that the user can compile route data across a plurality of plan views including stairs, elevator, escalator, and the like, while switching the plurality of plan views and corresponding structure information to be presented or scrolling the window using the operation keys and the like of the input unit 13.

Upon completion of the input and compile processes of the structure information, the input structure information is sent to the destination guidance data acquisition server 2B via the communication unit 11 (step S203). Subsequently, the destination guidance data acquisition server 2B executes processes for storing the structure information in the sequence shown in FIG. 14B (step S204).

The destination guidance data acquisition server 2B receives the structure information sent from the destination guidance data acquisition terminal 1B by the communication unit 21 (step S204A). The server 2B stores the received structure information in the structure information storage unit 26 (step S204B), thus ending the process in the structure information compile step. Note that the structure information can be stored in the format shown in FIGS. 4B and 4C.

Figure 16:
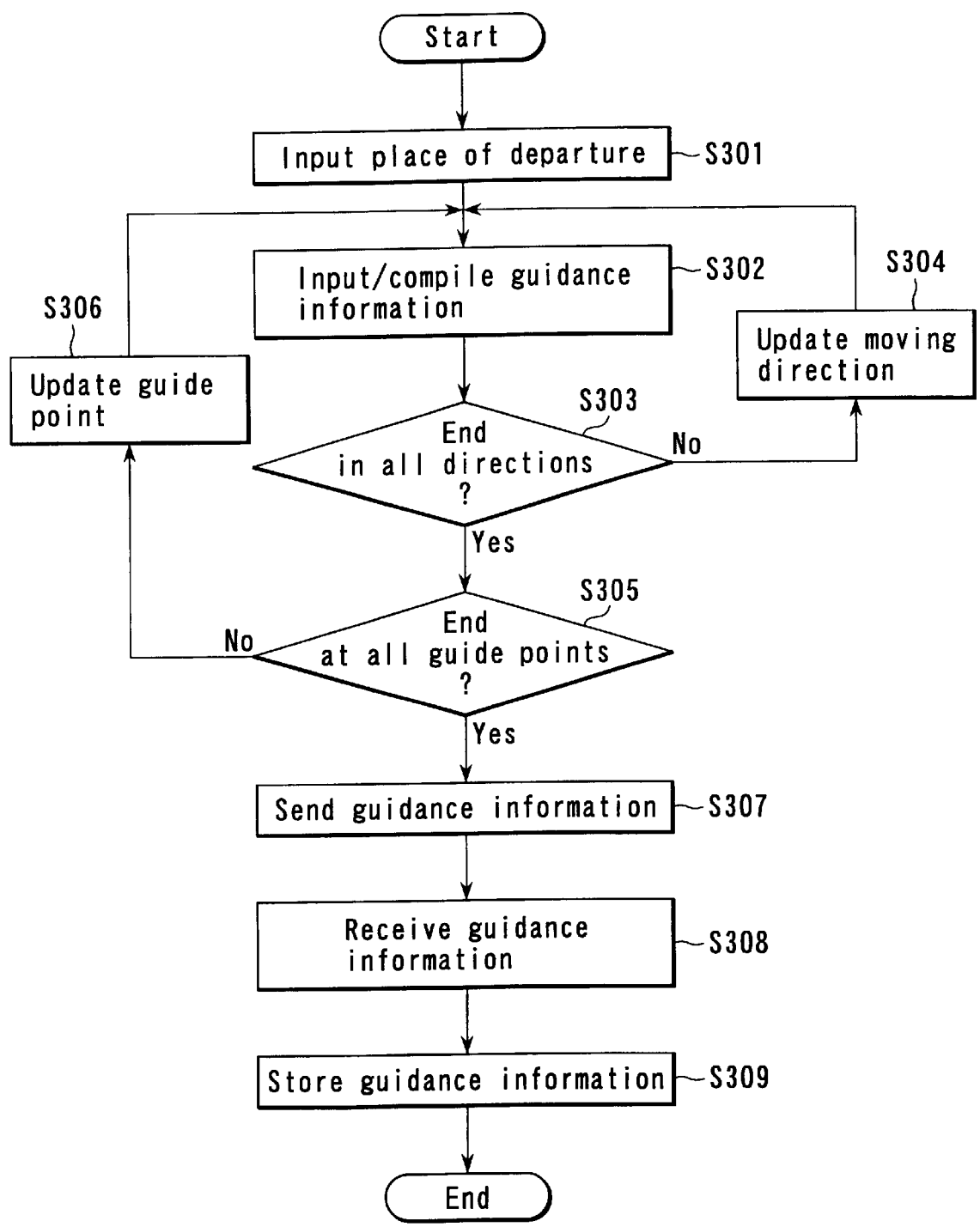
FIG. 16 is a flowchart showing the flow of processes in the guidance information compile step in the second embodiment.

The processing contents of the guidance information compile step will be explained below using the flowchart of FIG. 16. In FIG. 16, the destination guidance data acquisition terminal 1B executes processes in steps S301 to S307, and the destination guidance data acquisition server executes process in steps S308 and S309.

The destination guidance data acquisition terminal 1B makes the user designate a point of departure of the compile process using the input unit 13 (step S301). More specifically, the user designates a guide point on the window (similar to FIG. 15C or 15D) presented on the presentation unit 14 at the end of the structure information compile step using a touch pen or the like of the input unit 13.

The user then inputs and compiles guidance information at the designated guide point (step S302). More specifically, arrows that point to respective approach and exit directions are displayed in turn on the guide point on the window (similar to FIG. 15C or 15D) presented on the presentation unit 14. The user inputs and compiles landmark data and landscape data using the guidance information compile unit 18 in correspondence with the directions of these arrows. Note that the landscape data can use still picture data directly taken by a digital camera or the like connected to the destination guidance data acquisition terminal 1B or artificial images prepared in advance.

It is then checked if the compile processes for all the approach and exit directions of the designated guide point are complete (step S303). If No in step S303, the moving direction is updated (step S304), and guidance information at the guide point is input to continue to the compile process. On the other hand, if Yes in step S303, the flow advances to the next process.

It is checked if the compile processes for all the guide points are complete (step S305). If No in step S305, the guide point is updated to a non-compiled one (step S306) to repeat the compile process (step S302).

Note that the user may manually update the guide point using a touch pen or the like of the input unit 13. Alternatively, the guide information compile unit 25 may automatically select a neighboring guide point and present it to the user, thus supporting the compile process. The automatic update function of guide points can greatly reduce the load on the user, and can greatly improve the efficiency of the data acquisition process.

Upon completion of the compile process of the guidance information, the guidance information is sent to the destination guidance data acquisition server 2B via the communication unit 11 (step S307). The destination guidance data acquisition server 2B receives the guidance information sent from the destination guidance data acquisition terminal 1B by the communication unit 21 (step S308A). The server 2B stores the received guidance information in the guidance information storage unit 25 (step S308B), thus ending the process of the guidance information compile step. Note that the guidance information may be stored in the format shown in FIG. 6.

Figure 18:
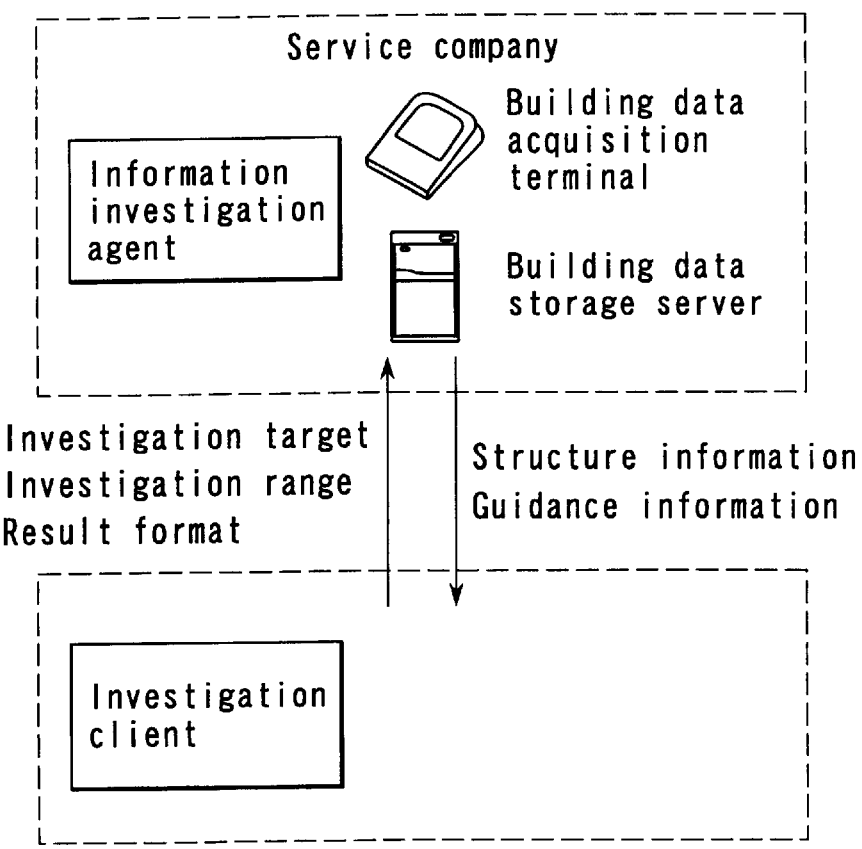
FIG. 18 shows the overall arrangement of a destination guidance data acquisition service in each embodiment.

As described above, according to the destination guidance data acquisition system of this embodiment, since landmark information and landscape information required to guide along the three-dimensional structure of the building can be efficiently acquired, and can be immediately stored as digital data, a destination guidance data acquisition service (FIG. 18) that can greatly reduce the data acquisition time and human errors can be implemented.

(Third Embodiment)

The third embodiment of the present invention will be described below. A destination guidance data acquisition system according to this embodiment aims at presenting a natural moving route to the user as presentation information.

Figure 15D:
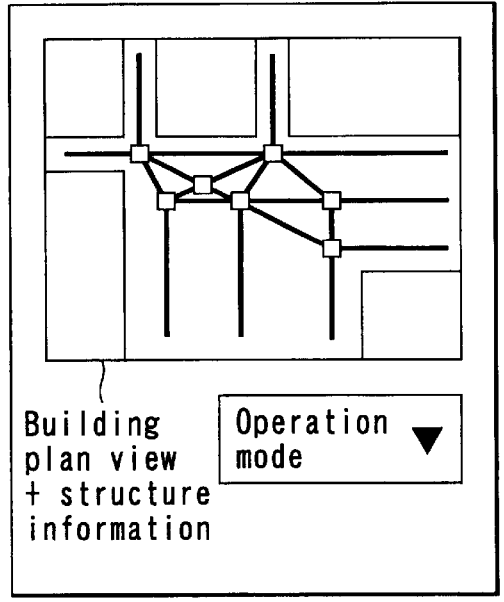

More specifically, in the second embodiment, the user manually inputs and compiles route data and guide point data using the structure information compile unit 17 (see FIGS. 15C and 15D). These route data and guide point data must be laid out so as not to form an unnatural route that connects arbitrary departure and destination points, independently of the combinations of the departure and destination points. For example, assume that movement information in a hall in a railway station shown in FIG. 15B is generated. In this case, if line segments, which are set near the center of respective paths shown in FIG. 20A, are simply connected, as shown in FIG. 20B, a route that connects points C and D unnaturally detours, as shown in FIG. 20C. In such case, one line segment must be added to form a smooth route, as shown in, e.g., FIG. 20D.

However, in practice, it is difficult for all combinations of departure and destination points to manually check if routes connecting them are unnatural. Also, human errors and quality variations inevitably occur if such checking process is manually done. Furthermore, if obstacles such as columns or the like are present in the hall, as shown in FIG. 20E, a route must be formed to avoid them, which further complicates the problems.

These problems have their roots in the presence of innumerable routes that pedestrians can choose in a broad-area site such as a hall, the vicinity of ticket gates, concourse, or the like, and all of these routes cannot be covered manually. Hence, this embodiment will explain a destination guidance data acquisition system that can solve the aforementioned problems by making a computer automatically generate route data and guide point data of the broad-area site.

Figure 19:
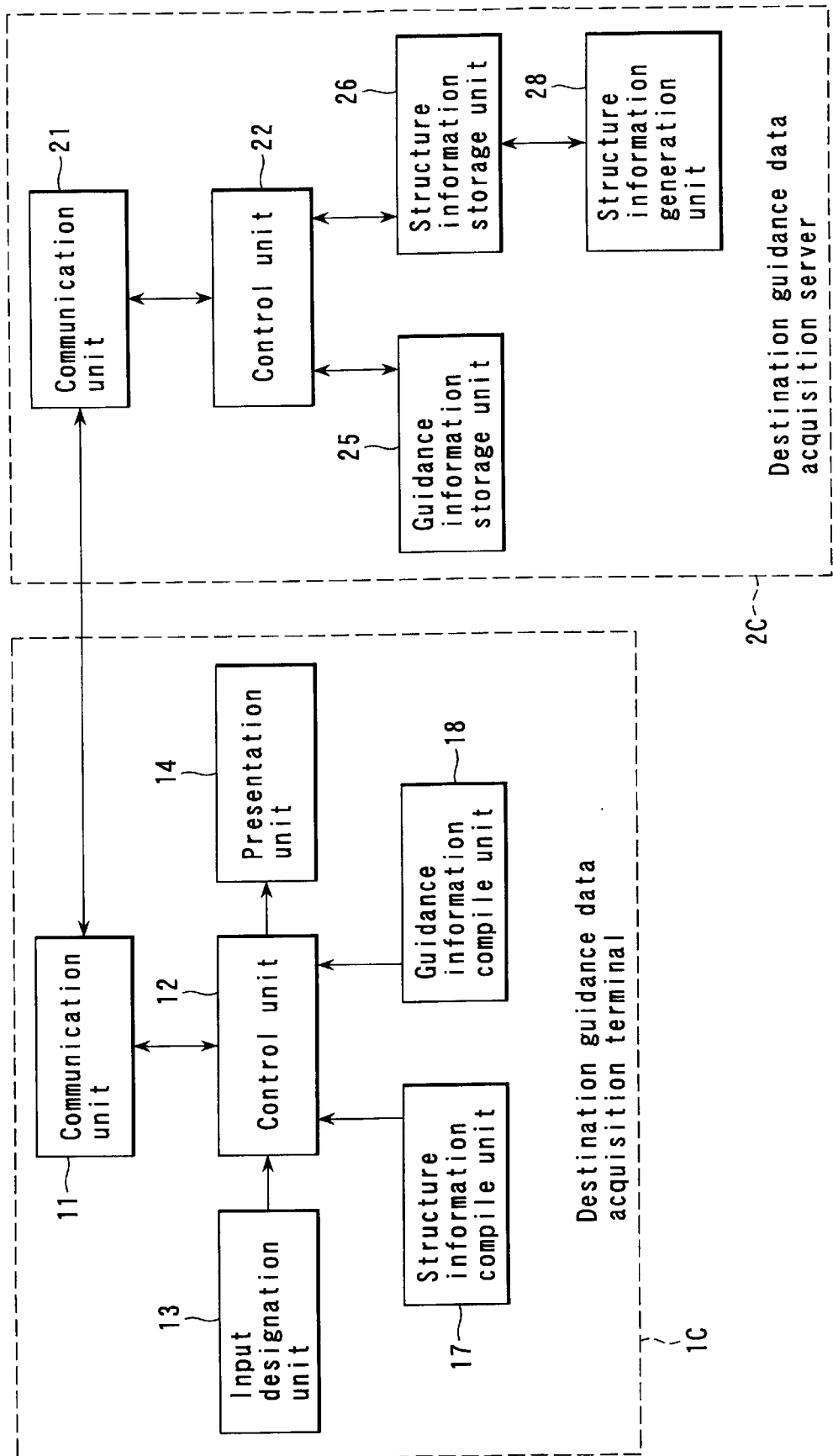
FIG. 19 is a block diagram showing the overall arrangement of a destination guidance data acquisition apparatus according to the third embodiment.

FIG. 19 is a block diagram showing the overall arrangement of a destination guidance data acquisition system according to the third embodiment. As can be seen from FIG. 19, the destination guidance data acquisition system of the third embodiment has an arrangement in which a structure information generation unit 28 is added to the arrangement (see FIG. 12) of the system of the second embodiment. This structure information generation unit 28 automatically generates route data and guide point data of a broad-area site.

Figure 21C:
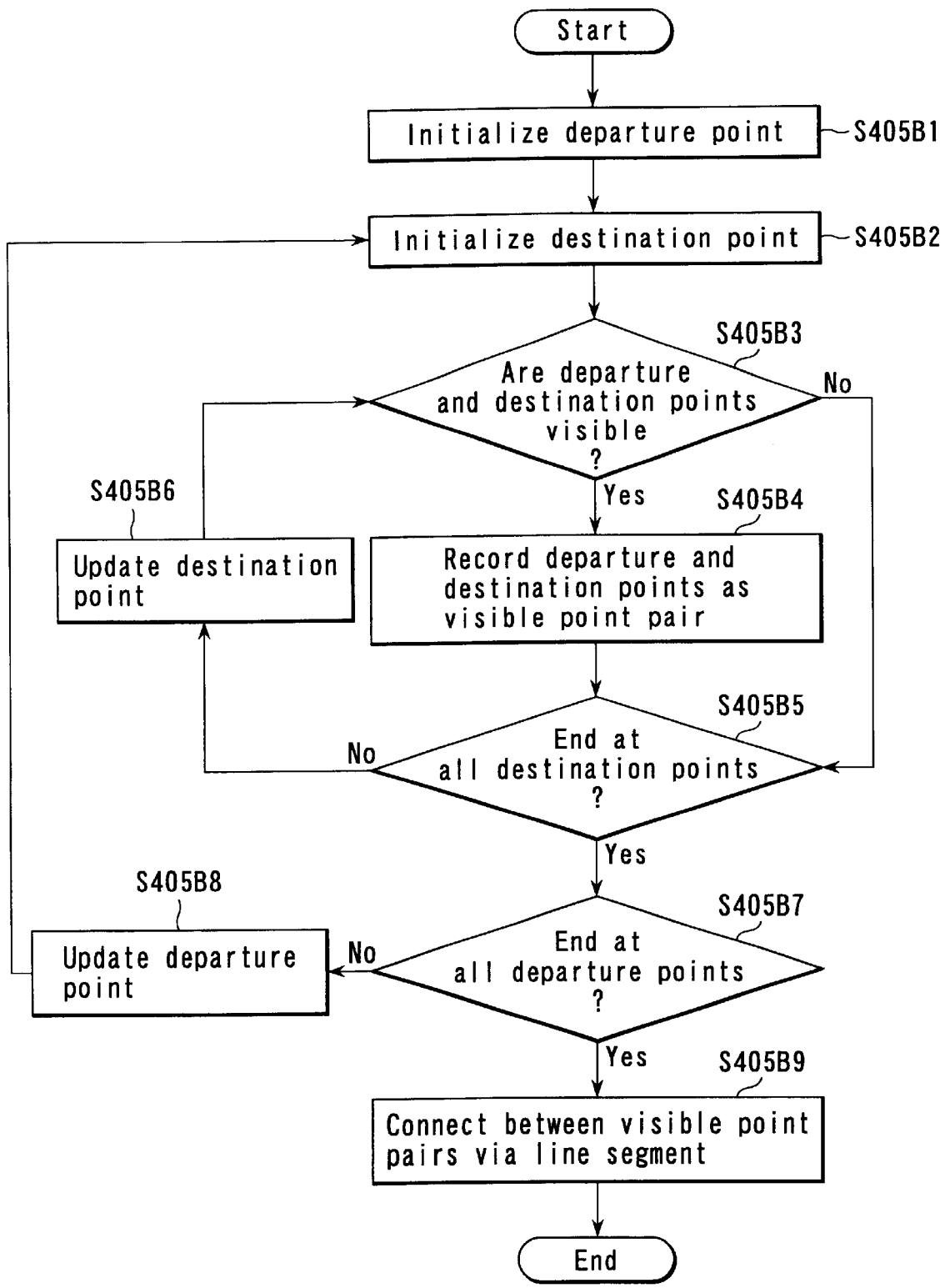

The operation of the destination guidance data acquisition system according to this embodiment can be roughly classified into a structure information compile process and guidance information process as in the system of the second embodiment (see FIG. 13). FIGS. 21A, 21B, and 21C are flowcharts of the structure information compile process to be executed by the destination guidance data acquisition system according to this embodiment (i.e., the detailed processing contents in step S200 shown in FIG. 13). In FIG. 21A, the processes in steps S401 to S404 are executed by a destination guidance data acquisition terminal 1C, and the process in step S405 is executed by a destination guidance data acquisition server 2C.

As shown in FIG. 21A, the destination guidance data acquisition system inputs a plan view with the contents that have been explained in the second embodiment, and inputs and compiles predetermined structure information (steps S401 and S402).

Figure 22C:
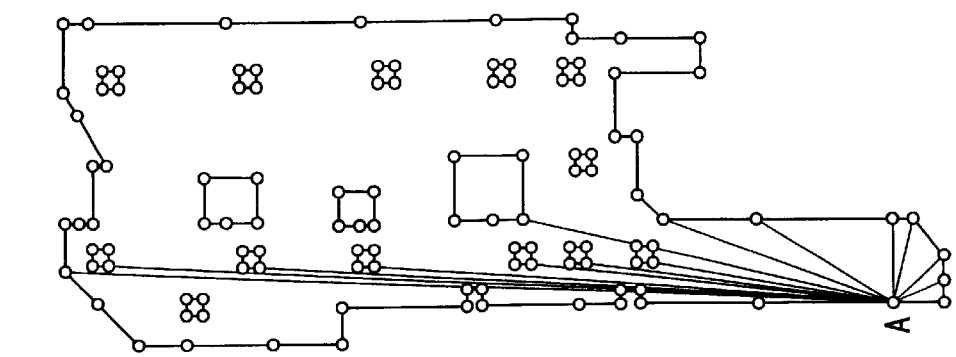
FIGS. 22A to 22E show processing examples in the structure information compile step in the third embodiment.
Figure 22B:
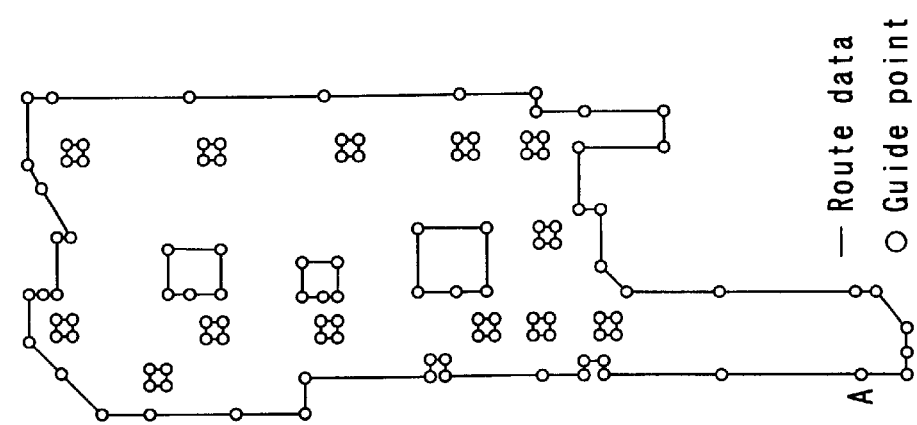
Figure 22A:
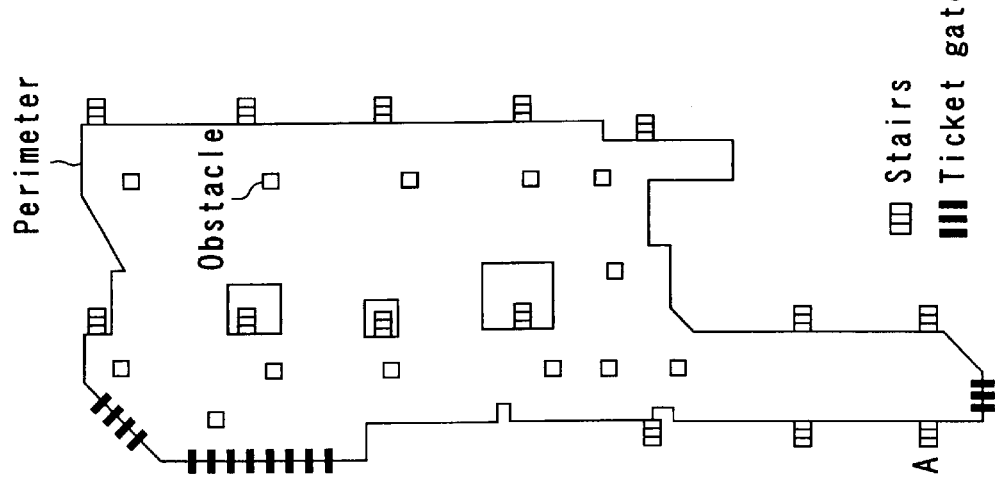

The structure information compile unit 17 inputs initial values of the structure information of the broad-area site (step S403). Note that the initial values of the structure information include route data that represent the perimeter of the broad-area site and contour lines of obstacles, and guide point data that represent break points of the route data. The guide points are mainly set at the turning points of contour lines, and are also set at the positions of stairs, ticket gates, and the like as candidates of departure and destination points of destination guidance. In step S403, in case of the broad-area site in the railway station shown in, e.g., FIG. 22A, route data and guide points shown in FIG. 22B are input as initial values.

In the process in step S403, route data and guide point data must be overwritten on the plan view of the building using a touch pen or the like as in the compile process of the structure information in the second embodiment. However, even if such process is done, no problem discussed in the second embodiment is posed. A process for tracing the perimeter of the broad-area site and the contours of obstacles using the plan view as a rough sketch is close to a mechanical routine, and hardly causes human errors and quality variations if such process is manually done. Since this process is close to a mechanical routine, it can also be implemented as a computer program.

The communication unit 11 sends the structure information, which has undergone the compile process and the like, to the destination guidance data acquisition server 2C (step S404). The destination guidance data acquisition server 2C executes the processes shown in FIGS. 21B and 21C on the basis of the received structure information, thus generating structure information of the broad-area site.

The destination guidance data acquisition server 2C receives the structure information from the destination guidance data acquisition terminal 1C (step S405A). The structure information generation unit 28 of the destination guidance data acquisition server 2C executes processes in steps S405B1 to S405B9 shown in FIG. 21C on the basis of the structure information. More specifically, the structure information generation unit 28 selects arbitrary one point from the guide points stored in the structure information storage unit 26 as a departure point (step S405B1). Also, the unit 28 selects, as a destination point, another guide point of the broad-area site, which is not already selected as the departure point (step S405B2).

It is checked if the departure and destination points can be seen (visible) from each other, i.e., if a line segment that connects the departure and destination points does not cross any other route data (step S405B3). If it is determined that the line segment does not cross any other route data, the departure and destination points are recorded as a visible point pair (step S405B4). For example, if guide point A in FIG. 22B is selected as a departure point, pairs of end points of line segments shown in FIG. 22C are recorded as visible point pairs. On the other hand, if it is determined that the line segment crosses other route data, or after the process in step S405B4 is complete, the flow advances to step S405B5.

It is checked if the visibility checking process for all destination points other than the departure point is complete (step S405B5). If No in step S405B5, the destination point is updated (step S405B6) to repeat the visibility checking process for all destination points. If Yes in step S405B5, it is checked if the visibility checking process for all departure points is complete (step S405B7). If No in step S405B7, the departure point is updated (step S405B8), and the destination point is reset to repeat the visibility checking process.

Figure 22E:
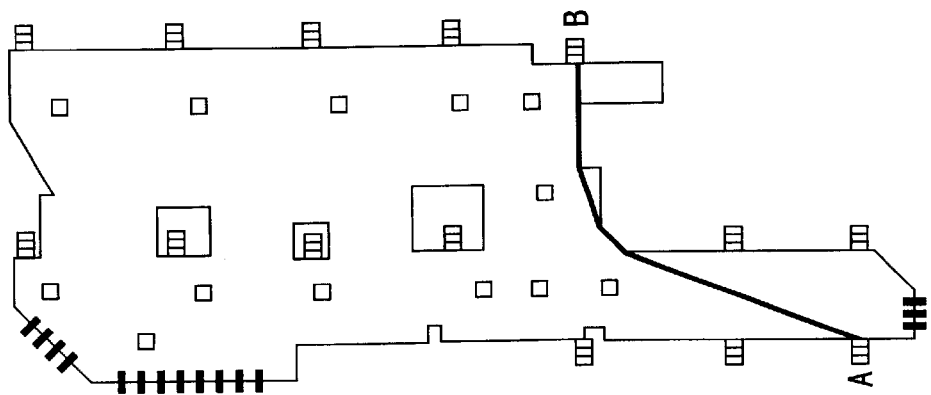
Figure 22D:
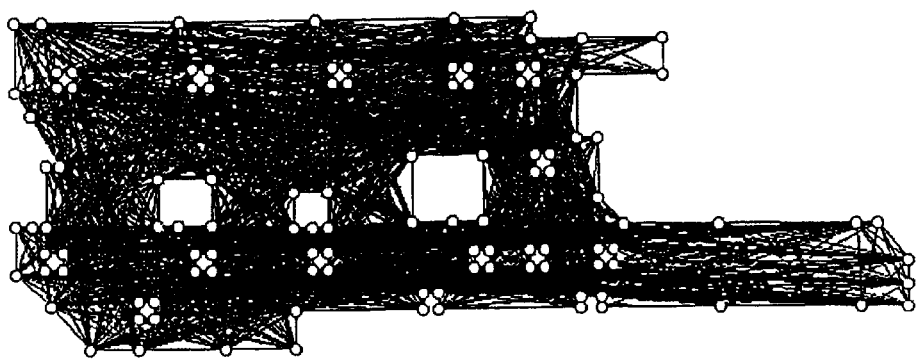

If it is determined in step S405B7 that the process is complete for all departure points, all visible point pairs obtained so far are connected to each other via line segments (step S405B9). For example, when all different visible points are connected via line segments in FIG. 22B, a network shown in FIG. 22D is obtained. This network is called a visibility graph, in which respective line segments represent route data, and respective vertices represent guide point data.

When a moving route is generated by extracting portions corresponding to an optimal route that connects the place of departure and destination from the route data and guide point data generated in this way, an unnatural route is never generated independently of the place of departure and destination selected. This is because a route that efficiently heads for the destination by tracing visible points in turn matches a typical one that a pedestrian who knows every inch of that place takes. For example, an optimal route from point A to point B in FIG. 22B is as shown in FIG. 22E.

When it is not desirable that the generated route is too close to the perimeter of the broad-area site or obstacles, the contour line of the perimeter of the broad-area site is reduced, and those of obstacles are enlarged before the visibility graph is obtained. Also, when the generated route is to be presented as a smooth one, the route can be approximated by a spline curve or the like.

As described above, according to the destination guidance data acquisition system of this embodiment, since route data and guide point data can be laid out so as not to form an unnatural route that connects two points in the broad-area site, a destination guidance acquisition service that can further reduce the data acquisition cost and human errors can be implemented.

(Fourth Embodiment)

A destination guidance system according to the fourth embodiment of the present invention will be described below. A destination guidance data acquisition system of this embodiment aims at providing presentation information which is easy for the user to understand.

More specifically, in the third embodiment, the structure information compile unit 17 and structure information generation unit 28 input and compile or generate route data and guide point data. The guide point data are mainly located at branch points of the route data. Actually, guide points must be located at places where destination guidance is to be presented to the user, i.e., places near landmarks within the sight of the user. Therefore, such place is not always a branch point of route data, and the user can often see a landmark on the line segment of route data.

Hence, in this embodiment, a guide point addition unit 29 generates a new guide point on the line segment of route data, so that destination guidance can be presented at a position where the user can recognize the route more easily.

Figure 23:
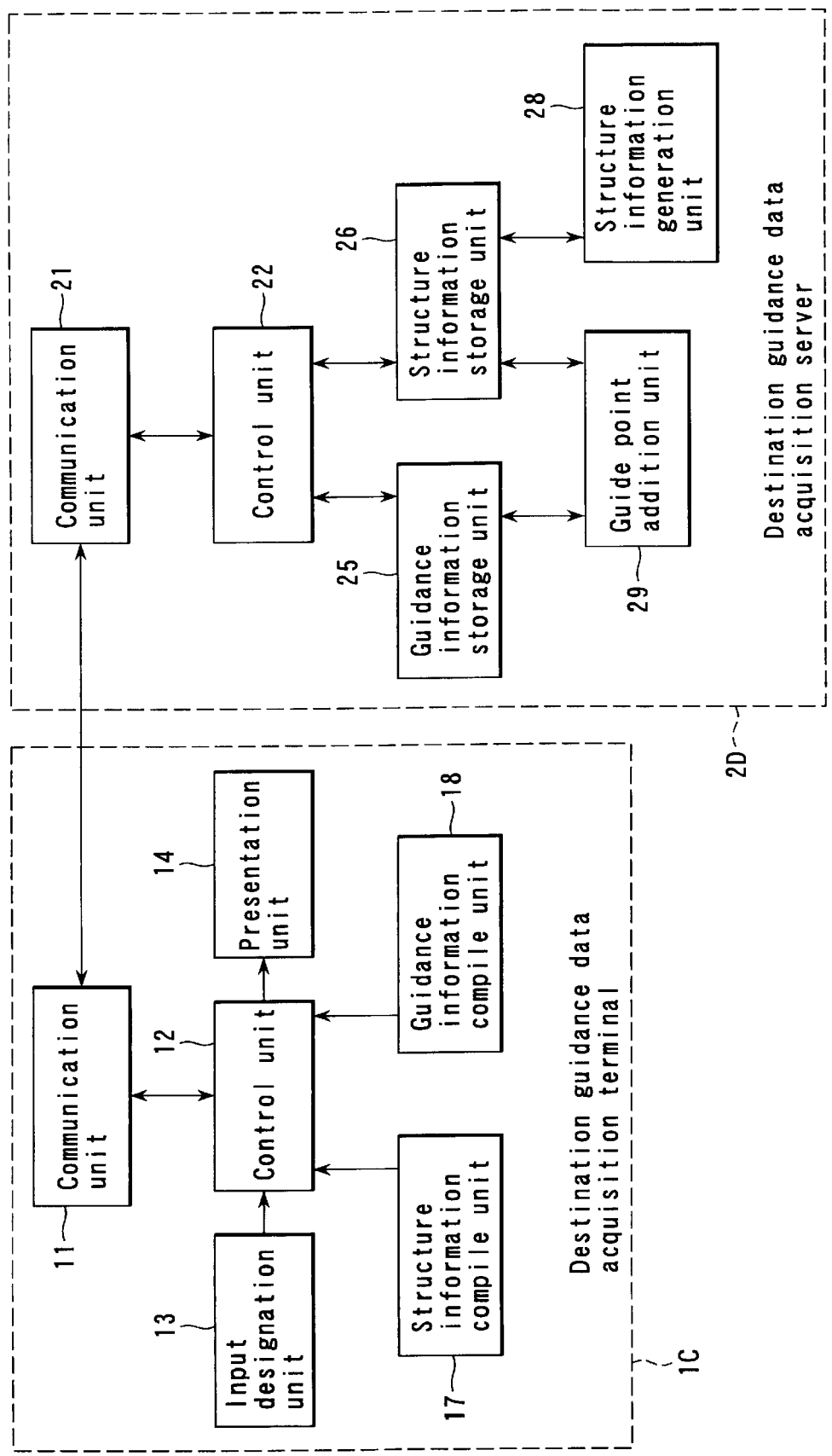
FIG. 23 is a block diagram showing the overall arrangement of a destination guidance data acquisition apparatus according to the fourth embodiment.

FIG. 23 is a block diagram showing the overall arrangement of a destination guidance data acquisition system according to the fourth embodiment. As can be seen from FIG. 23, the destination guidance data acquisition system according to the fourth embodiment has an arrangement in which the guide point addition unit 29 is added to the arrangement of the third embodiment shown in FIG. 19. The guide point addition unit 29 adds a guide point, which is effective for the user to understand the moving route, on the line segment of route data stored in the structure information storage unit 26, in accordance with a predetermined input.

Figures 24A, 24B:
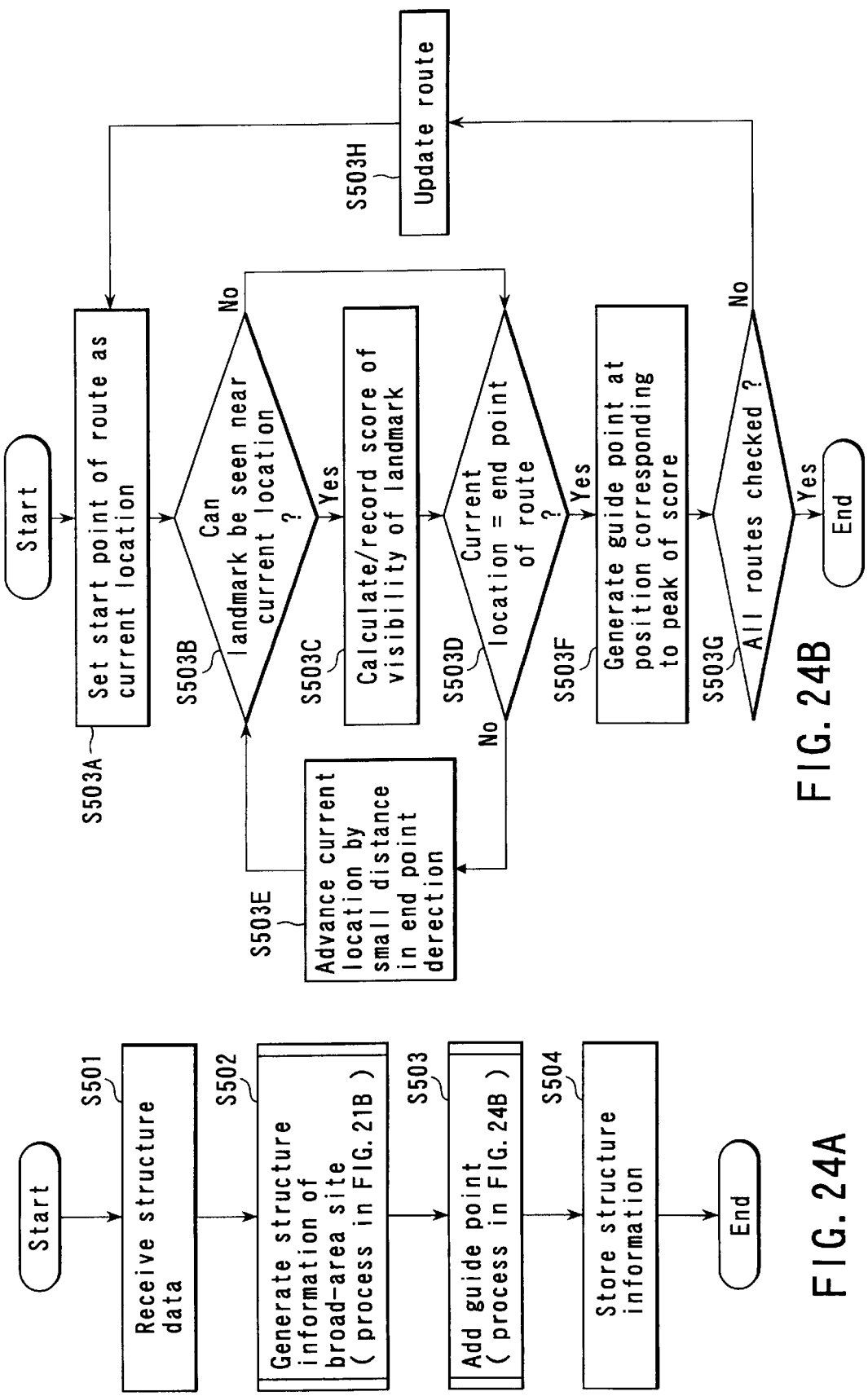
FIGS. 24A and 24B are flowcharts showing the flow of processes in the structure information compile step in the fourth embodiment.

The operation of the destination guidance data acquisition system according to this embodiment can be roughly classified into a structure information compile process and guidance information process as in the systems of the second and third embodiments (see FIG. 13). FIGS. 24A and 24B are flowcharts of the structure information compile process to be executed by a destination guidance data acquisition server 2D of the destination guidance data acquisition system according to this embodiment (i.e., the detailed processing contents in step S200 shown in FIG. 13). Note that the processes in steps S501, S502, and S503 in FIG. 24A are the same as those described in the third embodiment. A process for adding a guide point on the line segment of route data, which is executed in step S503, will be described in detail below with reference to FIG. 24B.

As shown in FIG. 24B, the guide point addition unit 29 selects arbitrary one of route data and sets a start point of that route data as the current location (step S503A). It is checked if any landmark can be seen near the current location (step S503B). If Yes in step S503B, a score of visibility of that landmark is calculated and recorded (step S503C). If no landmark is seen near the current location, the flow advances to step S503D.

It is checked if the current location is an end point of a route (step S503D). If No in step S503D, the current location is advanced toward the end point by a small distance (step S503E), and the flow returns to the process (step S503B) for checking if any landmark can be seen near the current location. On the other hand, if it is determined that the current location is an end point of a route (in other words, if a scan of one route from the start point to the end point is complete), a guide point is generated at a position where the score of visibility has a peak value (step S503F).

It is checked if all routes have been checked (step S503G). If it is determined that routes to be checked still remain, arbitrary one of these routes is selected to update the route (step S503H), thus repeating the same processes. On the other hand, if it is determined that all routes have been checked, the process in step S503 in FIG. 24B ends.

Figure 25A:
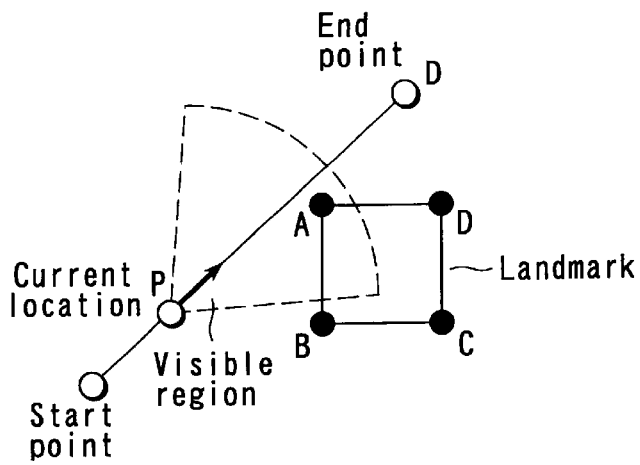
FIGS. 25A to 25E show a visibility determination process of a landmark in the fourth embodiment.
Figure 25B:
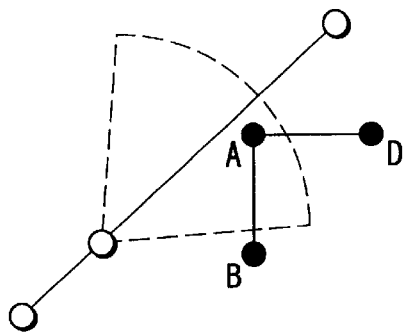

Whether or not any landmark can be seen near the current location can be checked in step S503B by determining if any landmark is present within the visible region of the current location. Note that the visible region indicates a fan-shaped region indicated by the dotted line in, e.g., FIG. 25A. Whether or not any landmark is present within this visible region can be checked by determining if a portion of the landmark falls within the visible region. For example, if a landmark has a shape expressed by a polygon, as shown in FIG. 25A, it is checked if any of sides of the polygon falls within the visible region. In this case, since sides AB and AD fall within the visible region, as shown in FIG. 25B, it is determined that the landmark is present within the region.

Figure 25C:
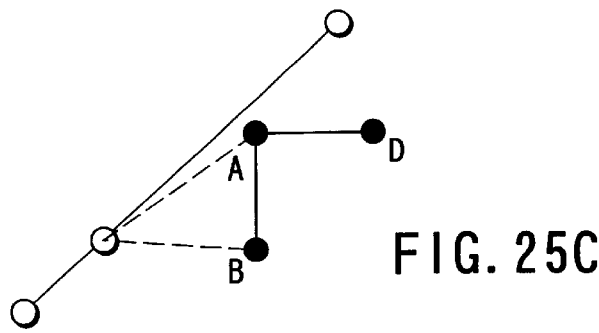

Upon calculating the score of visibility of the landmark in step S503C, it is checked if each side of that landmark can be seen from the current location. For this purpose, it can be checked if the two end points of each side, and the current location form visible point pairs. For example, in FIG. 25C, since line segments that connect points A and B, and the current location do not cross any other line segments (e.g., route data that represents the contour of the landmark), it is determined that side AB is visible from the current location.

Figure 25D:
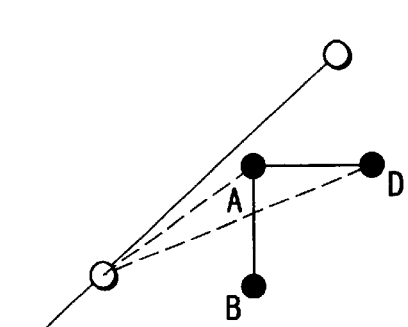
Figure 25E:
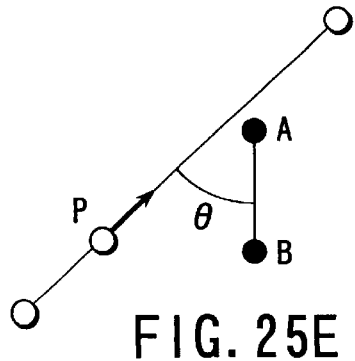

On the other hand, since a line segment that connects point D and the current location crosses line segment AB in FIG. 25D, it is determined that side AD is invisible from the current location. Then, an acute angle each side, which is determined to be visible, and a moving direction vector make is calculated. For example, acute angle θ side AB and vector PD make is calculated in FIG. 25E.

A higher score is given as this angle is closer to 90°, i.e., the current location and landmark are at face-to-face positions more correctly. For example, the score can be calculated using a function given by "score of visibility=α(inner product of vectors BA and PD)". Where α is a proportionality constant.

As described above, according to the destination guidance data acquisition system of this embodiment, a guide point can be added to a position on the line segment of route data where a landmark is seen well. As a result, a destination guidance service (FIG. 17) that can present guidance at a position where the user can recognize a route more easily can be implemented.

(Fifth Embodiment)

A destination guidance system according to the fifth embodiment of the present invention will be described below. The destination guidance system of this embodiment aims at generating presentation information which can guide the user from the place of departure to the destination more appropriately.

More specifically, in, e.g., the destination guidance system according to the first embodiment, the route information generation unit 24 extracts a portion corresponding to an optimal route that connects the place of departure and destination input at the input unit 13 from the structure information stored in the structure information storage unit 26. This process is implemented by searching for a route with a minimum cost using Dijkstra's algorithm, which is known as a method of obtaining an optimal route on network. The cost computation in the first embodiment uses the distance of a route. Hence, according to the destination guidance system of the first embodiment, presentation information associated with the shortest distance can be prevented.

However, a route with a shorter distance is not always an optimal one for pedestrians. For example, it is often important for pedestrians that a route has a smaller number of turning points, and passes by a larger number of landmarks which allow the pedestrian to confirm the current location, unless it takes a large detour.

Hence, this embodiment generates a route that can guide the user from the place of departure to the destination more appropriately by calculating a cost in consideration of the number of turning points and the number of guide points included in a route in addition to its distance.

Figure 26:
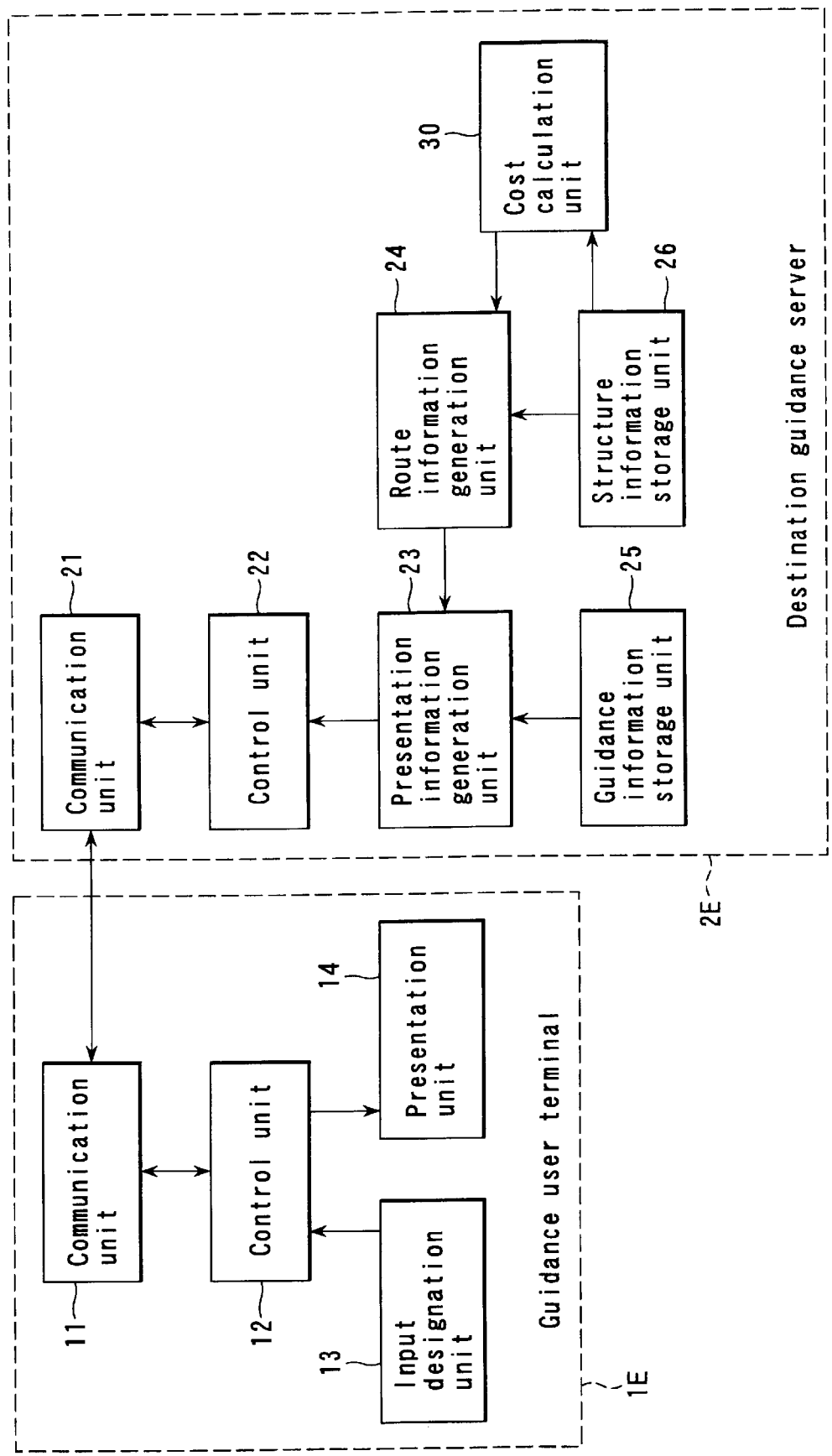
FIG. 26 is a block diagram showing the overall arrangement of a destination guidance apparatus according to the fifth embodiment.

FIG. 26 is a block diagram showing the overall arrangement of a destination guidance system according to the fifth embodiments of the present invention. As can be seen from FIG. 26, the destination guidance system of the fifth embodiment has an arrangement in which a cost calculation unit 30 is added to the arrangement of the first embodiment shown in FIG. 1.

The cost calculation unit 30 searches for a route with a minimum cost by calculating the cost in consideration of the number of turning points and the number of guide points included in a route using the Dijkstra's algorithm or the like. That is, since a pedestrian often loses his or her way upon turnaround, the number of turning points included in a route is preferably smaller. For this purpose, a calculation is made to increase the cost upon tracing a line segment which turns at a larger angle in route search. On the other hand, since a pedestrian becomes anxious when he or she goes along a route without any landmarks, the cost is decreased upon tracing a line segment including a larger number of guide points. For example, the cost calculation unit 30 calculates the cost of each line segment included in a route using a function given by:

"cost=distance+(α×rotation angle)−(β×number of guide points)"

where α and β are positive constants. Also, the rotation angle indicates an angle the previous and current line segments make. By searching for a route which minimizes a cost, a plain guidance route for guiding the user from the place of departure to the destination can be generated.

As described above, according to the destination guidance system of this embodiment, since a route which has a smaller number of turning points and passes by more landmarks can be generated, a destination guidance service (FIG. 17) that guides the user from the place of departure to the destination more appropriately can be implemented.

(Sixth Embodiment)

A destination guidance data acquisition system according to the sixth embodiment of the present invention will be described below. The destination guidance data acquisition system of this embodiment efficiently provides landmark data and landscape data at guide points with lower cost.

That is, in, e.g., the fourth embodiment, landmark data and landscape data which serve as landmarks in all approach and exit directions of respective guide points are input and compiled using the guidance information compile unit 18 (see FIG. 16). However, the cost required for this process is considerably high. Especially, since landscape data must be manually acquired at an actual site, the cost required for this process becomes higher with increasing number of guide points. When the landscape of a given landmark has changed, or when a new obstacle is set in a broad-area site and a guide point has moved, most of existing landscape data must be re-acquired.

Figure 27:
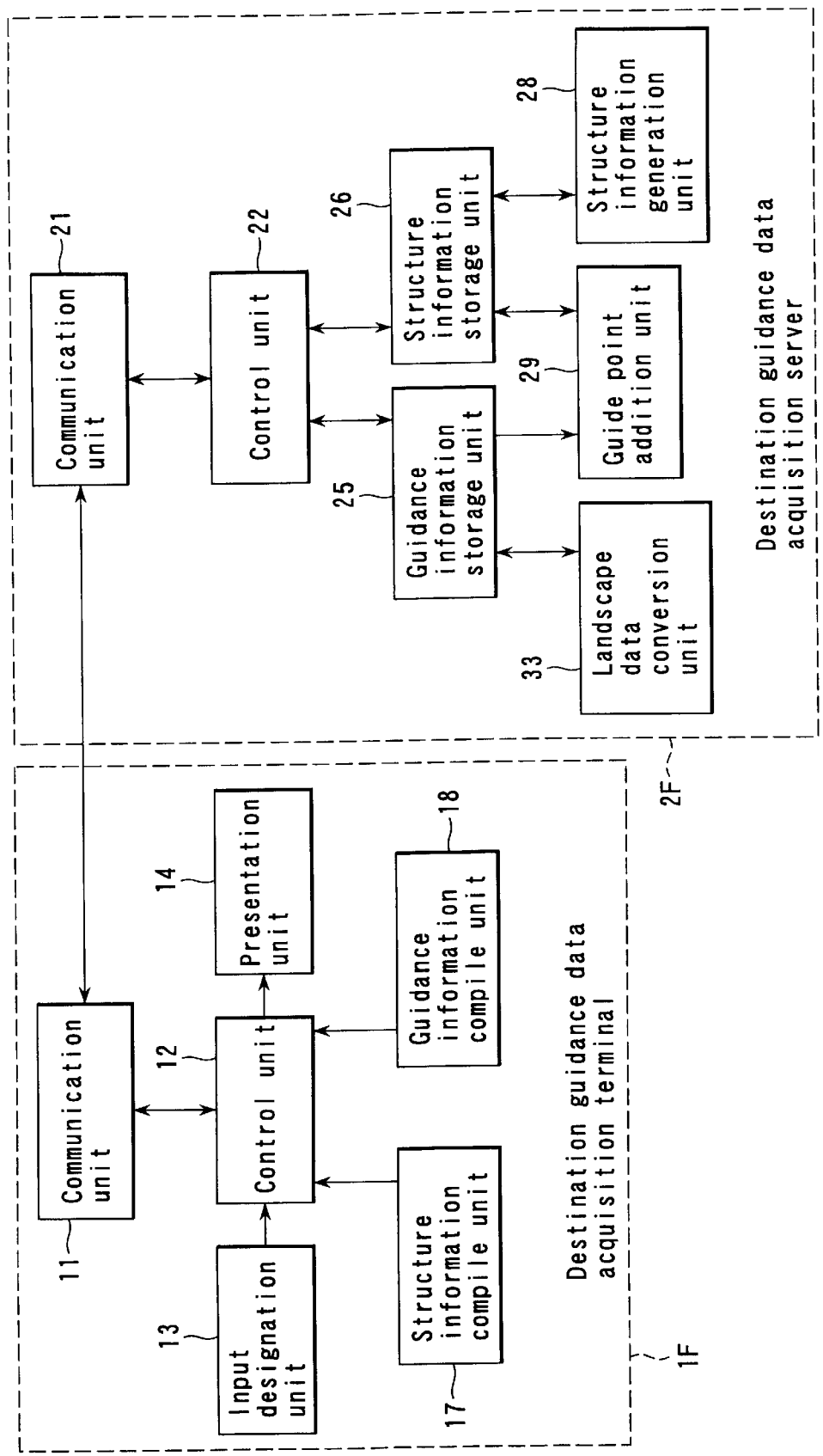
FIG. 27 is a block diagram showing the overall arrangement of a destination guidance data acquisition apparatus according to the sixth embodiment.

FIG. 27 is a block diagram of a destination guidance data acquisition system according to the sixth embodiment. As can be seen from FIG. 27, the destination guidance data acquisition system of this embodiment has an arrangement in which a landscape data conversion unit 33 is added to the arrangement of the fourth embodiment shown in FIG. 23.

Figure 28:
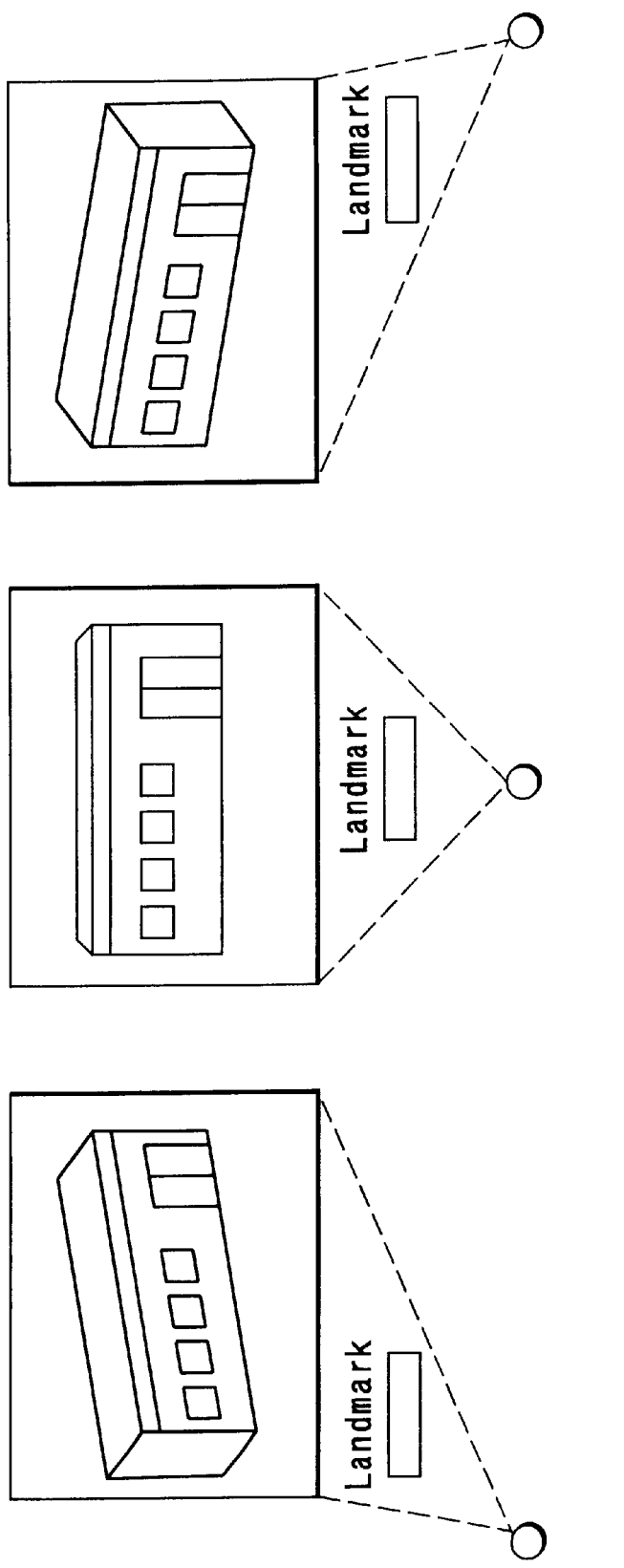
FIG. 28 shows conversion examples of landscape data in the sixth embodiment.

The guidance information storage unit 25 of the destination guidance data acquisition system of this embodiment stores a plurality of landscape data of each landmark seen from different directions. The landscape data conversion unit 33 generates landscape data at all guide points by interpolating the plurality of landscape data in correspondence with the positions of guide points. The landscape data conversion unit 33 can generate a landscape seen from another position by interpolating landscapes of a given landmark seen from three directions, as shown in, e.g., FIG. 28.

With this arrangement, since several landscape data need only be acquired per landmark, the process cost can be greatly reduced. Even when the landscape of a given landmark has changed, only the landscapes of that landmark can be re-acquired. Even when a new obstacle is set in the broad-area site, a new landscape can be generated by re-interpolating the acquired landscapes in correspondence with the moved guide point position.

(Seventh Embodiment)

A destination guidance system according to the seventh embodiment of the present invention will be described below. The destination guidance system of this embodiment provides user-friendly guidance by selecting and presenting information, which is effective for the guidance from the generated presentation information.

That is, in, e.g., the fifth embodiment, the presentation information generation unit 23 generates presentation information. This presentation information is expressed by landmark data and landscape data at respective guide points on a route generated by the route information generation unit 24, and next directions to go. However, in practice, guidance need not always be presented at all guide points on the route. More specifically, it is often convenient for the user if the system selects particularly characteristic guide points and presents them at appropriate intervals that do not make the user feel anxious.

Hence, this embodiment selects guide points where guidance is to be presented, on the basis of the intervals between neighboring guide points, and the scores of visibility of landmarks on a route.

Figure 29:
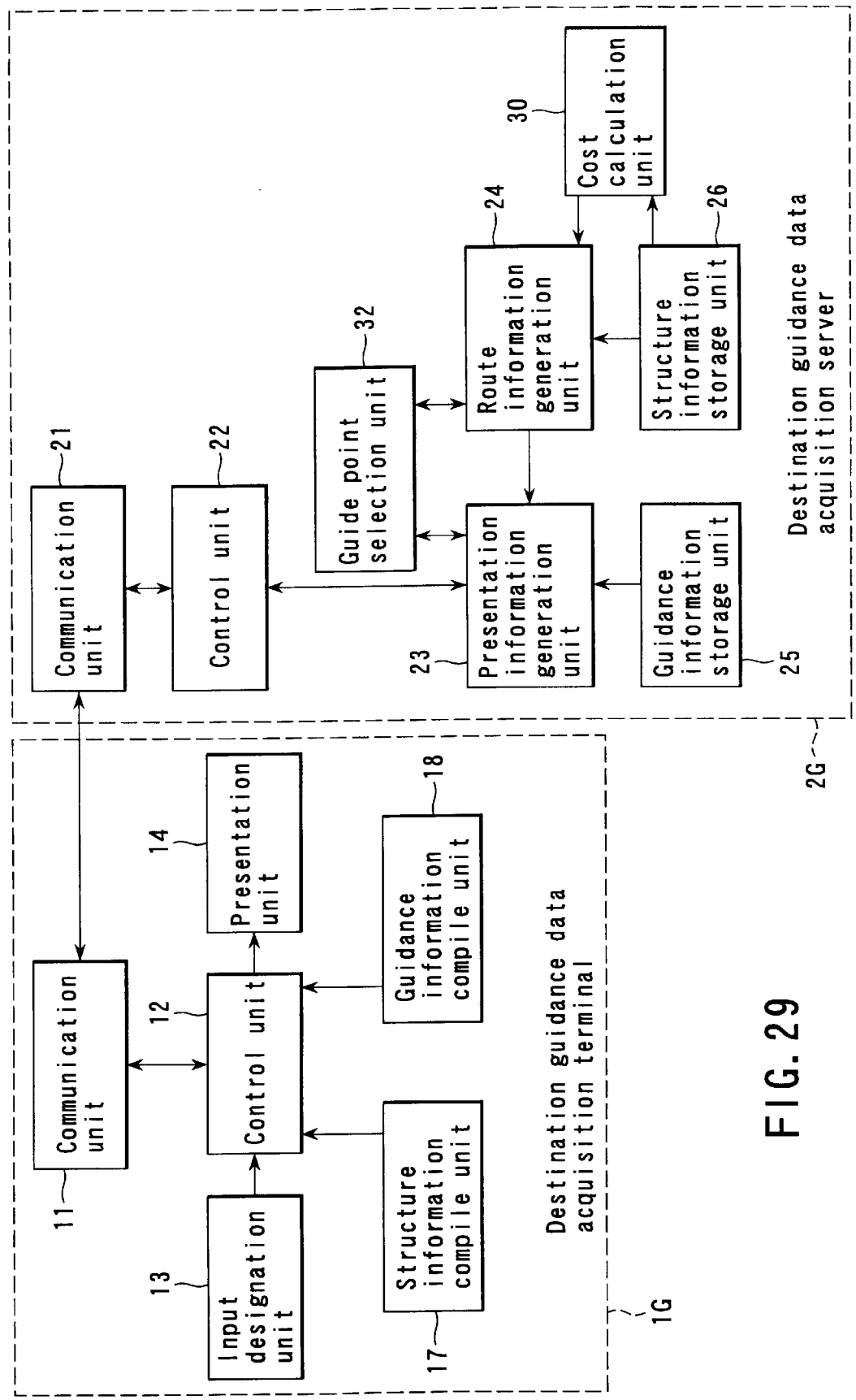
FIG. 29 is a block diagram showing the overall arrangement of a destination guidance apparatus according to the seventh embodiment.

FIG. 29 is a block diagram showing the overall arrangement of a destination guidance system according to the seventh embodiment. As can be seen from FIG. 29, the destination guidance system of the seventh embodiment has an arrangement in which a guide point selection unit 32 is added to the arrangement of the fifth embodiment shown in FIG. 26.

The guide point selection unit 32 selects guide points where guidance is to be presented, on the basis of the intervals between neighboring guide points, and the scores of visibility of landmarks on a route. More specifically, an optimal combination of guide points on a route can be obtained using a function given by:

Score of a combination of guide points=$\Sigma\{(\alpha \times \text{score of visibility}) - (\beta \times (\text{ideal interval} - \text{interval from previous guide point})2)\}$ where $\alpha$ and $\beta$ are positive constants. Also, the ideal interval indicates a distance that a pedestrian can securely go without any landmarks.

As described above, according to the destination guidance system of this embodiment, since guidance can be presented with reference to outstanding landmarks at appropriate intervals that do not make the user feel anxious, a destination guidance service (FIG. 17) which is more convenient for the user can be implemented.

(Eighth Embodiment)

A destination guidance system according to the eighth embodiment of the present invention will be described below. As shown in FIG. 10, the position acquisition unit 16 of the user terminal can acquire position data from the position providing units 31 equipped in the building via near-distance wireless communications such as Bluetooth™. This function exploits the fact that the user terminal receives only a radio wave from a specific wireless device within a given narrow range. However, in practice, it is difficult to accurately adjust the coverage of a radio wave in terms of cost. In a railway station or the like, not only route guidance but also other information delivery services may be given. In such case, wireless devices that use the same communication system may be equipped together. For this reason, the user terminal receives radio waves from a plurality of wireless devices, and often fails to detect a nearby position providing unit 31.

The aforementioned problem will be described in detail below. For example, assume that wireless devices are laid out, as shown in FIG. 30. In FIG. 30, position providing units 31 used in the destination guidance service are indicated by marks ★, and information providing devices used in other information delivery services are indicated by marks ☆. Actually, when a pedestrian receives the destination guidance service, the wireless devices with marks ★ alone are to be detected. However, if devices with marks ☆ use the same communication system, radio waves from the devices of both the services are received and, hence, detection often requires a long time or fails.

Such problem is posed, e.g., when the number of communication partners designated upon detection is smaller than the number of existing communication partners. On the other hand, in order to attain quick detection, the number of communication partners is preferably minimized. Hence, this embodiment solves this problem by controlling the number of communication partners by exploiting layout information of wireless devices equipped in the building.

FIG. 31 shows the arrangement of the position acquisition unit 16 of this embodiment. As can be seen from FIG. 31, the position acquisition unit 16 has a position detector 161 and position detection controller 162. The position detector 161 receives position data from the position providing unit 31. The position detection controller 162 controls the operation of the position detector 161 in accordance with the layout information of wireless devices in the building, and sends the position detection result received from the position detector 161 to the switching unit 15.

FIG. 32 shows a guidance route from guide point 20 to guide point 22, and layout of wireless devices equipped around the route. The layout information of wireless devices is stored in the guidance information storage unit 25 in a format shown in FIG. 33. In FIG. 33, "device ID" is a unique ID used to specify a wireless device, and the device ID of, e.g., Bluetooth™ is used.

Also, "type" indicates the use purpose of that wireless device. For example, "position provision" represents that the corresponding wireless device is used as a position providing unit, and "information delivery" represents that the corresponding wireless device is used in a service for delivering building information or guidance information. Also, "setting location" is information used to specify the setting location of each wireless device, and is expressed by a three-dimensional coordinate position like (50, 20, 10) in the building.

Upon guiding from guide point 20 to guide point 22 in FIG. 32, the presentation information generation unit 23 generates position detection control information of respective guide points with reference to the layout information of wireless devices shown in FIG. 33. Note that the position detection control information has a format shown in, e.g., FIG. 34. In FIG. 34, "position providing device ID" indicates the ID of the nearest one of wireless devices with marks ★ around each guide point. For example, for guide point 20, device 422626 is selected from five nearby devices 422626, 262642, 890512, 898522, and 179970 (e.g., devices with which the user terminal can communicate at guide point 20).

Also, "brake device ID" indicates the ID of one of wireless devices with marks ★, which are not present in the vicinity of the guidance route, and such device is used when the user mistakes the route. That is, the brake device ID indicates a wireless device which must not be detected when the user goes along a correct route. In FIG. 34, device 799701 is selected for guide point 20. When this brake device ID is used, if position data detected during guidance from guide point 20 to guide point 21 is 99701, the switching unit 15 displays information, which informs the user of a wrong direction, on the presentation unit. At this time, information for correcting a route, e.g., information for guiding the user to return to guide point 20, is preferably presented.

Furthermore, "detection parameter" in FIG. 34 is information used to control the number of communication partners detected by the position detector 161, and is represented by the number of nearby devices or the like. For example, "5" is designated for guide point 20.

Figure 35:
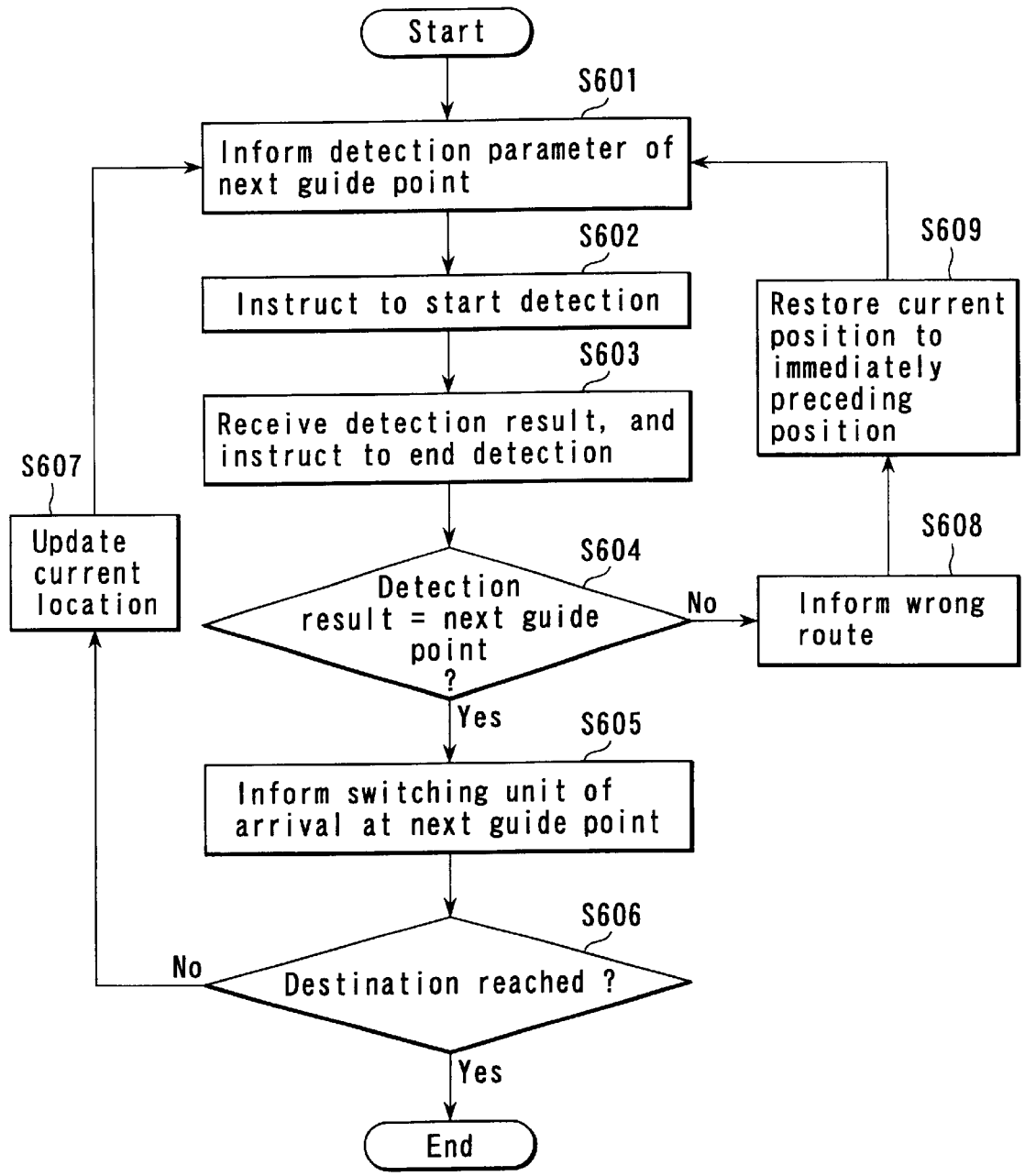
FIG. 35 is a flowchart showing the flow of processes of the position acquisition unit in the eighth embodiment.

The position detection controller 162 acquires position data while controlling the position detector 161 on the basis of the position detection control information shown in FIG. 34. FIG. 35 is a flowchart showing the sequence of this process. For example, upon guiding from, e.g., guide point 20 to guide point 21, the position detection controller 162 designates "2" as the number of communication partners on the basis of the detection parameter for guide point 21 (step 601), and instructs the position detector 161 to start detection (step 602). The position detection controller 162 waits for the detection result returned from the position detector 161, and instructs the position detector 161 to end detection upon receiving the detection result (step 603).

The position detection controller 162 then checks if the detection result indicates position providing unit 645482 corresponding to guide point 21 (step 604), and sends the checking result to the switching unit. If the checking result indicates a brake wireless device, since the user has mistaken the route, the position detection controller 162 instructs the switching unit to present guidance that prompts the user to return to guide point 20 (steps 608 and 609), and the flow returns to step 601. If the detection result indicates guide point 21, the position detection controller 162 instructs the switching unit to present guidance to next guide point 22 (step 605).

The position detection controller 162 checks if the detection result indicates the destination (step 606). If the detection result indicates the destination, the processing ends. If the detection result does not indicate the destination, the current position is updated (step 607), and the flow returns to step 601 to continue the processing.

As described above, according to the destination guidance system of this embodiment, even when wireless devices that use the same communication system are equipped together, since position data can be acquired in correspondence with a communication environment of each place, a destination guidance service (FIG. 17) with a stable automatic switching function of guidance presentation can be implemented.

Note that this embodiment is directed to only wireless devices equipped in the building, but the same control can be made in consideration of the distribution of terminals, which have established connection to respective wireless devices.

(Ninth Embodiment)

A destination guidance system according to the ninth embodiment of the present invention will be explained below. This embodiment will explain a destination guidance system which can facilitate transfer guidance using a destination guidance function, and allows the user to use destination guidance more naturally.

Figure 37:
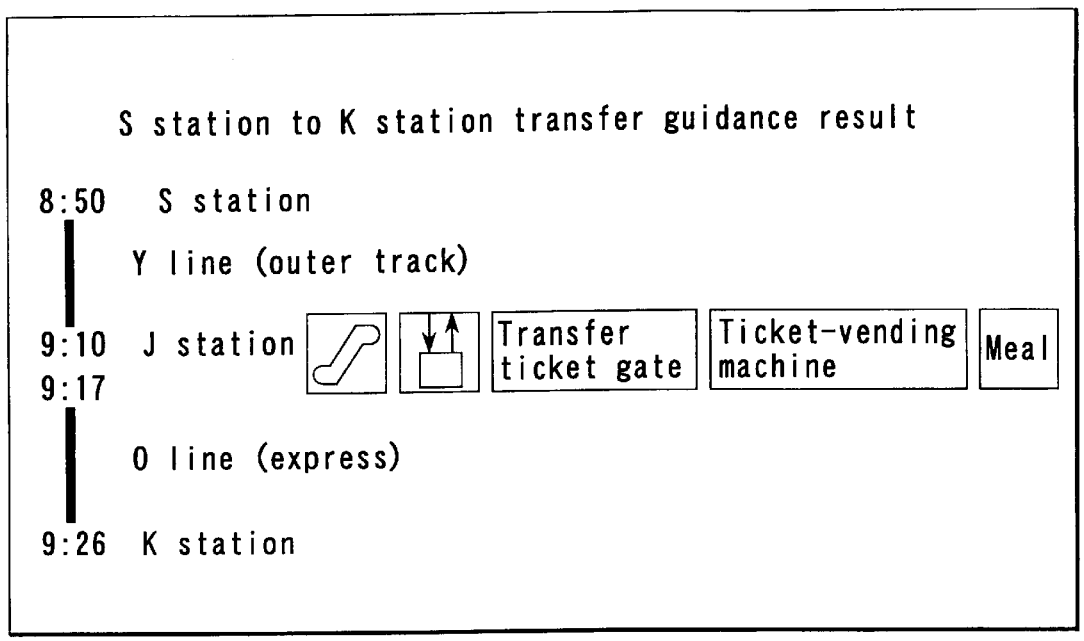
FIG. 37 shows an example of information which is provided by a destination guidance system according to the ninth embodiment to the user.

FIG. 37 shows an example of information to be provided to the user by the destination guidance system of this embodiment. A conventional transfer guidance guides a time- or fare-priority transfer route on the basis of a departure station, destination station, and time designated by the user. By contrast, in the example shown in FIG. 37, transfer routes available at a departure station are displayed as icons. Icons beside "J station" respectively indicate "a route along which the user can use escalator", "a route along which the user can use elevator", "a route that passes a dedicated transfer ticket gate", "a route that passes a ticket-vending machine at which the user can buy a transfer ticket", and "a route along which the user can take a meal".

Figure 38:
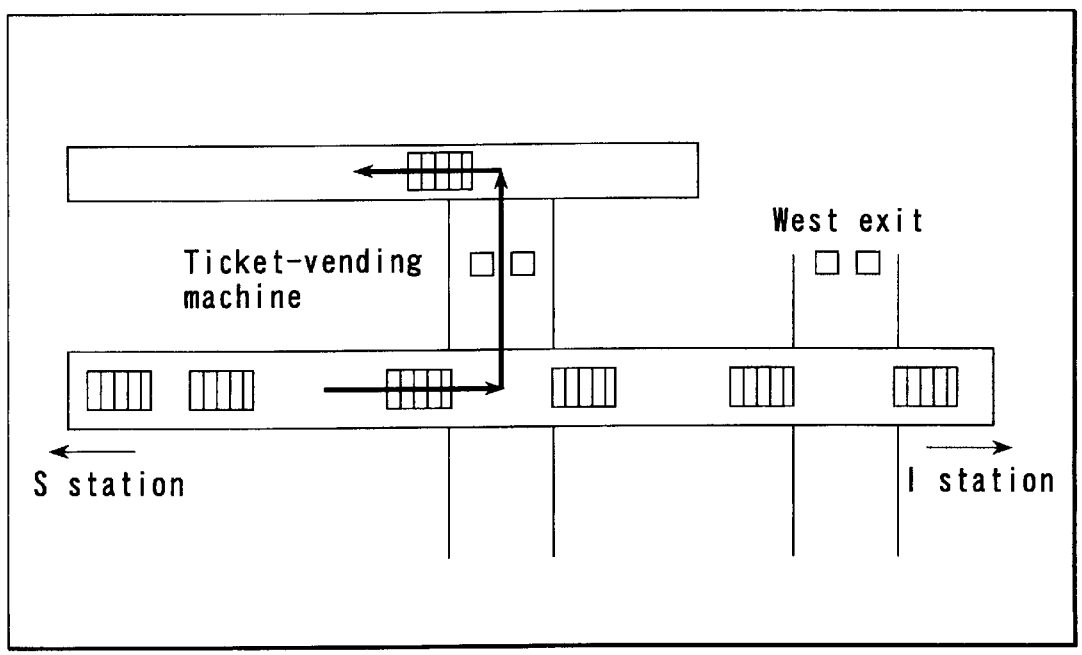
FIG. 38 shows a presentation example of one of a plurality of pieces of destination guidance information displayed in transfer guidance in the ninth embodiment.

FIG. 38 shows an example of destination guidance displayed when the user selects icon "a route that passes a dedicated transfer ticket gate) of the information shown in FIG. 37. Presently, a service that allows the user to see a list of facilities in a railway station is available. However, the user himself or herself must confirm using an area chart if such service is available within the ticket gates to be able to be used upon transfer. By contrast, when such service is combined with destination guidance, only the facilities that can be used upon transfer can be selectively presented.

Also, in the conventional transfer guidance, the transfer time is calculated as a given time. However, using the destination guidance, an actually required moving time can be calculated to designate a transfer time, which is used upon searching for a transfer route.

Figure 36:
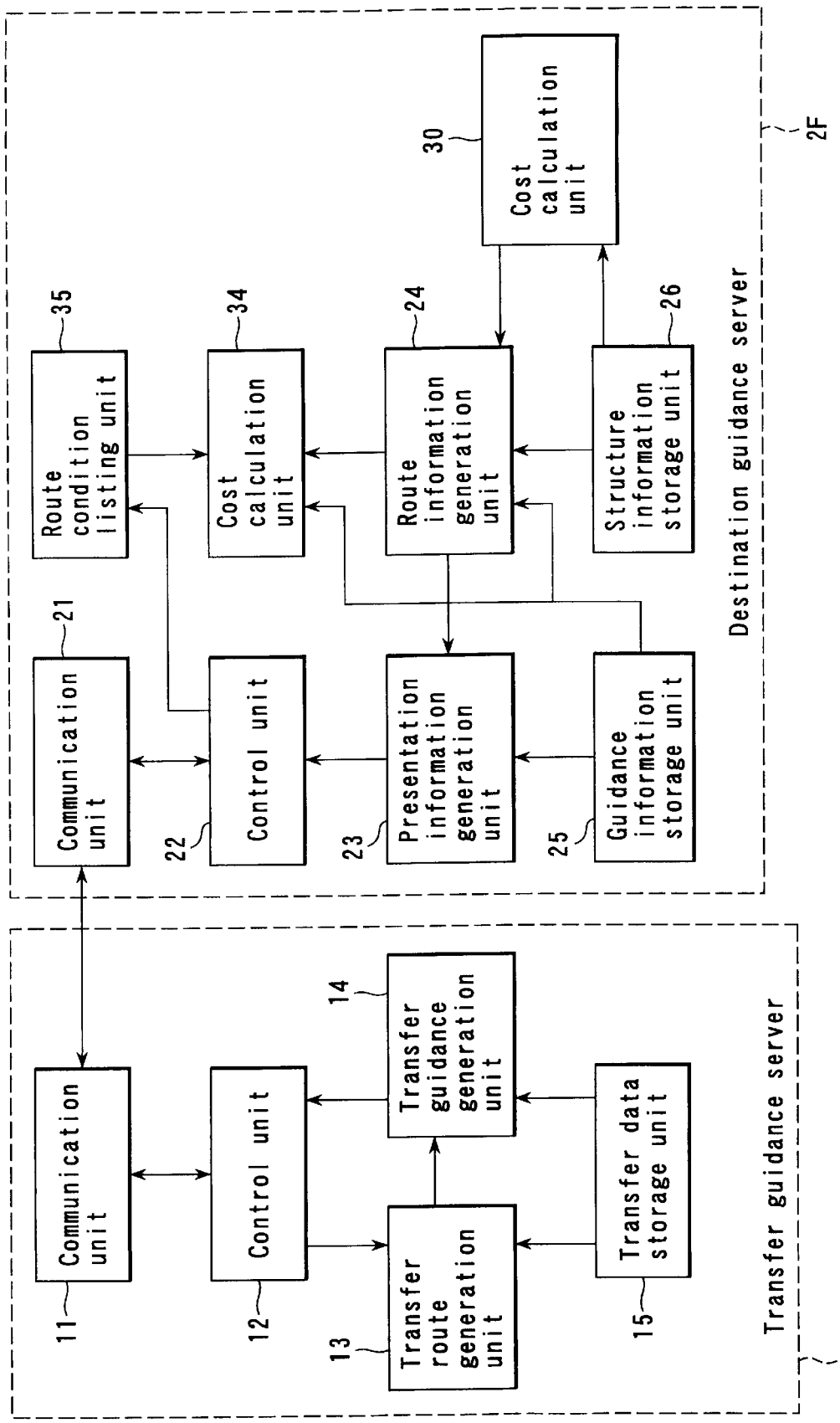
FIG. 36 is a schematic block diagram showing the arrangement of a destination guidance system of the present invention.

FIG. 36 shows a schematic arrangement of a destination guidance system of this embodiment. As shown in FIG. 36, the destination guidance system of this embodiment has a transfer guidance server 1F and destination guidance server 2F.

A communication unit 11 communicates with other servers, and transfer guidance clients such as browsers.

A control unit 12 controls a transfer route generation unit 13 and transfer guidance generation unit 14 to generate transfer guidance in accordance with a transfer guidance generation request received via the communication unit 11, and to send back the generation result to a request source via the communication unit 11. A transfer data storage unit 15 stores line data, timetable data, and the like required to calculate a transfer route and to generate guidance.

The transfer route generation unit 13 calculates a transfer route available for the requested departure station, destination station, and time, on the basis of data in the transfer data storage unit 15, and sends the calculation result to the transfer guidance generation unit 14. The transfer guidance generation unit 14 generates guidance to be presented in, e.g., HTML format, as shown in FIG. 37, in accordance with the route calculated by the transfer route generation unit 13. In order to display icons shown in FIG. 37, the transfer guidance generation unit 14 requests the destination guidance server to list moving routes upon generating guidance. In case of FIG. 37, the unit 14 requests the server to list moving routes from the platform of Y line (outer track) to that of O line (express) of J station.

At this time, the profile of the user and conditions designated in condition designation of a transfer guidance may be sent to the destination guidance server together if they are available. The contents to be sent to the destination guidance server are described in, e.g., a format "command, station type, place of departure, destination, departure time, condition 1, condition 2, etc".

Upon requesting moving routes in Shinjuku station in FIG. 37, the contents to be sent to the destination guidance server can be described as "route listing, S station, platform of Y line (outer track), platform of O line (express), 9:10, with baggage".

The operation of the destination guidance system in response to the aforementioned moving route search request will be described below with reference to FIG. 36. The destination guidance server 2F shown in FIG. 36 has an arrangement in which a route condition listing unit 35 and route listing unit 34 are added to the arrangement shown in FIG. 26. The route condition listing unit 35 lists conditions of routes to be searched for by the route information generation unit 24 on the basis of conditions designated by the transfer guidance server.

The route listing unit 34 holds a correspondence table shown in FIG. 40. In FIG. 40, "user condition" includes the user's physical condition, favor, situation at that time, and the like, and "objective class" includes route search conditions that the user may require under such conditions. In case of the aforementioned example, since "with baggage" is designated as a condition by the transfer guidance server, "barrier free" is determined to be a candidate of condition using the correspondence table shown in FIG. 40 upon searching for routes. Also, "meal" may also be selected as a candidate based on the departure time if it is around the lunch time.

Then, using a correspondence table shown in FIG. 39, practical "search conditions" are determined based on "objective class". In case of FIG. 37, since "barrier free" is the designated condition, "escalator" and "elevator" are listed as search conditions. The objective class "transfer" is a condition which is always selected if no conditions are designated and, hence, "transfer ticket gate", "settling machine", and "ticket-vending machine" are listed as search conditions. With the aforementioned process, in case of FIG. 37, search conditions "escalator, elevator, transfer ticket gate, settling machine, ticket-vending machine" are sent to the route listing unit 34.

On the other hand, when the transfer guidance server designates a required transfer time, e.g., when a transfer time=7 min is designated as a condition in case of FIG. 37, the route condition listing unit 35 adds the required transfer time to the search conditions to be sent to the route listing unit 34. When the user instructs to execute a transfer guidance while prioritizing time, the required transfer time is designated as a condition by the transfer guidance server.

The required transfer time is a condition common to all objects that the user must pass. Hence, search conditions "escalator & 7 min, elevator & 7 min, transfer ticket gate & 7 min, settling machine & 7 min, ticket-vending machine & 7 min" are output from the route condition listing unit 35. "Escalator & 7 min" indicates a condition for searching for a route along which the user can move using an escalator within 7 min.

Figure 41:
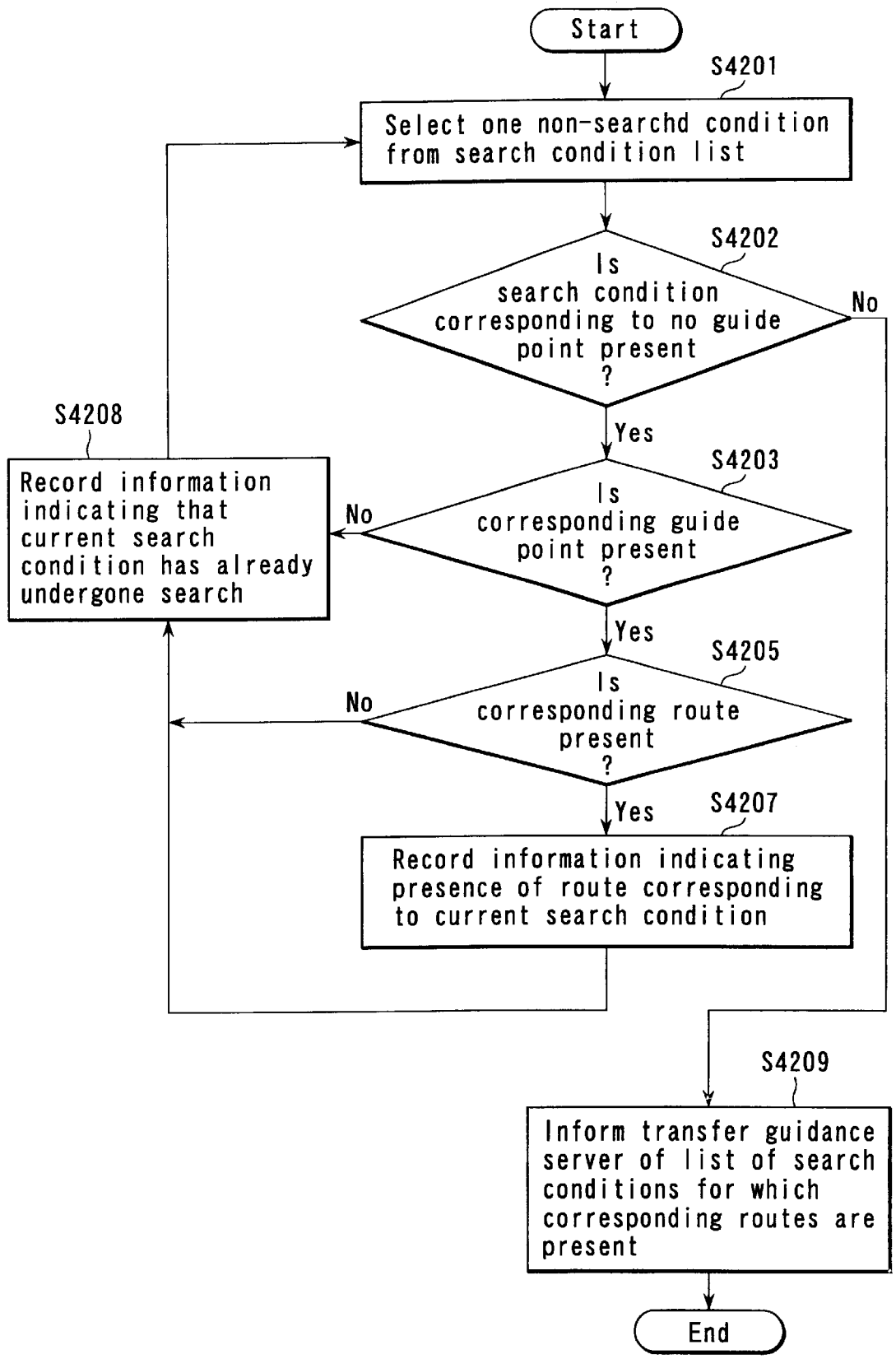
FIG. 41 is an operation flowchart of a route listing unit in the ninth embodiment.

The route listing unit 34 checks if routes that meet the search conditions listed by the route condition listing unit 35 are available. The operation of the route listing unit 34 will be described below using the flowchart of FIG. 41. One condition is selected from the search condition list passed from the route condition listing unit 35 (step 4201). In the aforementioned example, for example, "escalator" is selected. If all conditions have undergone search, the flow advances to step 4209; otherwise, the flow advances to step 4203 (step 4202).

It is then checked using data in a structure information storage unit 26 and guidance information storage unit 25 if a guide point corresponding to the selected search condition is present on the premises of the designated station (step 4203). If the corresponding guide point is present, the flow advances to step 4205; otherwise, the flow advances to step 4208 since a route need not be searched for.

A route information generation unit 24 then searches for a route that passes the guide point corresponding to the object designated by the search condition (step 4205). At this time, if the required transfer time is designated, the route information generation unit 24 searches for a route, the moving time of which is equal to or shorter than the designated required transfer time. If a route is found, the flow advances to step 4207; otherwise, the flow advances to step 4208 (step 4206). If a route is found, information indicating the presence of the route that matches the selected search condition is stored (step 4207).

Information indicating that the current search condition has already undergone the search process is stored (step 4208). The aforementioned process is repeated for all search conditions, and a list of search conditions under which routes are found is sent to the transfer guidance server (step 4209). For example, a list "escalator, elevator, transfer ticket gate, ticket-vending machine" is sent.

Upon receiving the aforementioned processing result of the destination guidance server, the transfer guidance generation unit 14 generates presentation information shown in FIG. 37 by appending the result from the destination guidance server to the transfer information calculated by the transfer route generation unit 13. For example, icons corresponding to "escalator, elevator, transfer ticket gate, ticket-vending machine" received from the destination guidance server are displayed. URLs that execute destination guidance under such conditions are appended to these icons as link information. When the user selects an icon displayed on the browser, the destination guidance server is caused to execute a process under the designated condition, and guidance shown in, e.g., FIG. 38, can be presented.

When the destination guidance server executes a moving route listing process without designating any required transfer time, if route guidance is given under the search condition of an icon of user's choice, the required transfer time may be exceeded. Hence, in this case, the destination guidance server informs corresponding required times in addition to the list of search conditions. For example, the server informs a result "escalatory·7 min, elevator·6 min, transfer ticket gate·5 min, ticket-vending machine·10 min".

Note that "escalator·7 min" indicates that a route using an escalator requires 7 min to move. If the required transfer time is exceeded when the user moves under the condition of the icon of his or her choice, the the destination guidance server re-calculates a transfer route in consideration of the moving time, and presents guidance to the user.

In this way, problems posed when the transfer and destination guidance services are independently given, and the user must use such services by checking and repetitively inputting conditions by himself or herself can be solved.

The processing in this embodiment can be implemented by a program that can be executed by a computer, and that program can be implemented as a computer readable storage medium.

Note that a magnetic disk, flexible disk, hard disk, optical disk (CD-ROM, CD-R, DVD, or the like), magnetooptical disk (MO or the like), semiconductor memory, and the like may be used as the storage medium of this embodiment, but the storage format is not particularly limited as long as they can store a program and can be read by a computer.

Also, an OS (operating system), database management software, MW (middleware) such as a network, or the like, which is running on a computer may execute some of processes for implementing this embodiment on the basis of an instruction of the program which is installed from the storage medium in the computer.

Furthermore, the storage medium in this embodiment is not limited to media independent from a computer, and includes a storage medium that downloads and stores or temporarily stores a program delivered via a LAN, Internet, or the like.

The number of storage media is not limited to one, and the storage medium according to this embodiment includes a case wherein respective processes of this embodiment are executed from a plurality of media. In such case, the form of media may adopt any of the aforementioned ones.

Note that the computer in this embodiment executes the respective processes on the basis of the program stored in the storage medium. Such computer may comprise either a standalone device such as a personal computer or the like, or a system formed by connecting a plurality of devices via a network.

The computer in this embodiment is not limited to a personal computer, and includes an arithmetic processing device, microcomputer, and the like included in an information processing apparatus, i.e., "computer" is a generic term of apparatuses and devices that can implement the functions of this embodiment based on the program.

According to the aforementioned embodiments, guidance can be given in, e.g., a railway station with a complicated three-dimensional structure with reference to both the entire route and detailed information of the current place. Furthermore, since information required to give such destination guidance can be efficiently acquired, destination guidance can be implemented at low cost, and its effect is great.

What is claimed is:

1. A destination guidance system utilizing a structure on premises of a building, comprising:

a structure information memory which stores structure information corresponding to information pertaining to the structure on the premises of the building, the structure information including a plurality of guide points on the premises of the building, and route data indicating moving routes that connect the plurality of guide points;

a guidance information memory which stores first guidance information including landmark data and landscape data concerning a plurality of approach and exit directions to and from each of the guide points;

an input unit configured to make a user input a desired place of departure and destination;

a recommended route generation unit configured to generate a recommended route, which is recommended upon movement from the place of departure to the destination, by selecting and connecting at least one of the route data stored in said structure information memory;

a presentation information generation unit configured to extract second guidance information concerning the plurality of the approach and exit directions to and from at least one guide point, which is present on the recommended route, from the first guidance information in said guidance information memory, and to generate presentation information that contains the second guidance information; and a presentation unit configured to present the presentation information.

2. A system according to claim 1, wherein said presentation information generation unit generates the presentation information to present third guidance information associated with movement across different floors, which are present on the recommended route, and fourth guidance information associated with movement on a single floor in different formats.

3. A system according to claim 1, wherein the presentation information includes information that pertains to the recommended route, and information that pertains to a moving direction and a current position.

4. A system according to claim 3 and utilizing current position data from a position providing device provided on the premises of the building, wherein said presentation unit switches the present information to the guidance information or the information that pertains to the recommended route at a predetermined guide point of the presentation information in response to the current position data, or a switching input from a user.

5. A system according to claim 1, wherein said recommended route generation unit generates the recommended route on the basis of a time condition or a guide point where the user wants to pass.

6. A railway station destination guidance system utilizing a structure on the premises of a railway station, comprising:

a structure information memory which stores structure information corresponding to information pertaining to the structure on the premises of the railway station, the structure information including a plurality of guide points on the premises of the railway station, and route data indicating moving routes that connect the plurality of guide points;

a guidance information memory which stores guidance information, the guidance information including landmark data and landscape data which concerns a plurality of approach and exit directions to and from each of the guide points;

an input unit configured to make a user input a desired place of departure and destination;

a recommended route generation unit configured to generate a recommended route, which is recommended upon movement from the place of departure to the destination, by selecting and connecting the route data stored in said structure information memory;

a presentation information generation unit configured to extract second guidance information concerning the plurality of the approach and exit directions to and from at least one of the guide points, which is present on the recommended route, from the first guidance information in said guidance information memory, and to generate presentation information that contains the second guidance information; and a presentation unit configured to present the presentation information.

7. A system according to claim 6, wherein said recommended route generation unit generates the recommended route on the basis of at least one of transfer information, a transfer time, a moving environment, and a facility on the premises of the railway station that the user wants to use, which are input by said input unit.

8. A system according to claim 7, wherein the presentation information includes at least one of the transfer information, third guidance information pertaining to the transfer time, fourth guidance information pertaining to the moving environment, fifth guidance information pertaining to the facility on the premises of the railway station that the user wants to use, information pertaining to the recommended route, and information pertaining to a moving direction and a current position.

9. A system according to claim 7, further comprising a moving time calculator which calculate a time required to move along the recommended route.

10. A server apparatus which generates information pertaining to guidance on the premises of a building and sends the information to a user terminal and utilizes a structure on the premises of a building, comprising:

a communication device configured to communicate with the user terminal;

a structure information memory which stores structure information corresponding to information pertaining to the structure on the premises of the building, the structure information including a plurality of guide points on the premises of the building and route data indicating moving routes that connect the plurality of guide points;

a guidance information memory which stores first guidance information, which includes landmark data and landscape data concerning a plurality of approach and exit directions to and from each of the guide points;

a recommended route generation unit configured to generate a recommended route, which is recommended upon movement from a place of departure to a destination input from the user terminal, by selecting and connecting at least one of the route data stored in said structure information memory; and a presentation information generation unit configured to extract second guidance information concerning the plurality of the approach and exit directions to and from at least one of the guide point, which is present on the recommended route, from the first guidance information in said guidance information memory, and to generate presentation information which contains the second guidance information and is sent to the user terminal via said communication device.

11. An apparatus according to claim 10, wherein the presentation information includes information that pertains to the recommended route, and information that pertains to a moving direction and a current position.

12. An apparatus according to claim 10, wherein said recommended route generation unit comprises:

a route search unit configured to search for a plurality of moving routes upon movement from the place of departure to the destination;

a cost calculator which calculates costs for the respective moving routes by scoring the number of turning points and the number of guide points included in each of the plurality of moving routes and obtain a cost calculator result; and a selection unit configured to select the recommended route from the plurality of moving routes on the basis of the cost calculation result.

13. An apparatus according to claim 10, wherein said presentation information generation unit extracts, from said guidance information memory, third guidance information associated with only a guide point designated in advance, of the guide points present on the recommended route.

14. An apparatus according to claim 10 and utilizing a position information transmission device provided on the premises of the building, wherein said communication device receives, from the user terminal, position information that the user terminal has received from the position information transmission device provided on the premises of the building, said apparatus further comprises a checking unit configured to check based on the position information received by said communication device whether the user is moving along the recommended route or not, and said presentation unit presents presentation information which includes third guidance information pertaining to the next guide point when said checking unit determines that the user is moving along the recommended route, and presents presentation information which includes fourth guidance information pertaining to a nearby guide point on the recommended route when said checking unit determines that the user is not moving along the recommended route.

15. A user terminal communicating with a server apparatus which generates information pertaining to guidance on a premises of a building, comprising:

an input unit configured to input a desired place of departure and destination on the premises of the building;

a communication device configured to send the place of departure and destination to the server apparatus, and to receive the information pertaining to guidance on the premises of the building from the server apparatus; and a presentation unit configured to present the information pertaining to guidance on the premises of the building.

16. A terminal according to claim 15 and communicating with at least one of a plurality of position information transmission devices provided on the premises of the building, wherein said communication device receives position information from at least one of the plurality of position information transmission devices, said terminal further includes a checking unit configured to check based on the received position information whether a user is moving along a recommended route or not, and said presentation unit presents presentation information which includes guidance information pertaining to the next guide point when said checking unit determines that the user is moving along the recommended route, and presents presentation information which includes guidance information pertaining to a nearby guide point on the recommended route when said checking unit determines that the user is not moving along the recommended route.

17. A terminal according to claim 16, further comprising a communication controller which controls said communication unit to receive the position information from only the predetermined position information transmission device.

18. A destination guidance method comprising:

storing structure information corresponding to information pertaining to a structure on the premises of a building, the structure information including a plurality of guide points on the premises of the building, and route data indicating moving routes that connect the plurality of guide points in a guidance information memory;

storing first guidance information, which includes landmark data and landscape data concerning a plurality of approach and exit directions to and from each of the guide points;

making a user input a desired place of departure and destination;

generating a recommended route, which is recommended upon movement from the place of departure to the destination, by selecting and connecting at least one of the stored route data;

extracting second guidance information concerning the plurality of the approach and exit directions to and from at least one of the guide point, which is present on the recommended route, from the guidance information in the guidance information memory;

generating presentation information that contains the guidance information; and presenting the presentation information.

19. A method according to claim 18, wherein the presentation information contains information that pertains to the recommended route, and information that pertains to a moving direction and a current position.

20. A computer readable memory storing a guidance program, the guidance program comprising:

first store means for causing a computer to store structure information corresponding to information pertaining to a structure on the premises of a building, the structure information including a plurality of guide points on the premises of the building and route data indicating moving routes that connect the plurality of guide points;

second store means for causing a computer to store guidance information, which includes landmark data and landscape data for a plurality of approach and exit directions to and from each of the guide points in a guidance information memory;

first generation means for causing a computer to generate a recommended route, which is recommended upon movement from a place of departure to a destination which are input from a user terminal, by selecting and connecting at least one of the stored route data;

second means for causing a computer to extract guidance information concerning the plurality of the approach and exit directions to and from at least one of the guide points, which is present on the recommended route, from said guidance information memory, and for generating presentation information that contains the guidance information; and means for causing a computer to send the presentation information to the user terminal via a communication device.

21. A medium according to claim 20, wherein the presentation information contains information that pertains to the recommended route, and information that pertains to a moving direction and a current position.

22. A destination guidance data acquisition system comprising:

a presentation unit configured to present a structural drawing on the premises of a building;

a structure information generation unit configured to generate structure information by designating a plurality of guide points on the premises of the building and route data indicating moving routes that connect the plurality of guide points on the structural drawing on the premises of the building;

a structure information memory which stores the structure information;

a guidance information generation unit configured to generate guidance information by inputting landmark data or landscape data, which serve as landmarks in a plurality of line-of-sight directions upon approaching or existing from each of the plurality of guide points of the structure information; and a guidance information memory which stores the guide information for each of the guide points.

23. A system according to claim 22, further comprising a compiler which compiles the structure information or the guidance information.

24. A destination guidance data acquisition terminal which acquires information pertaining to guidance on the premises of a building, and sends the acquired information to a server, comprising:

a presentation unit configured to present a structural drawing of the premises of the building;

a structure information generation unit configured to generate structure information by designating a plurality of guide points on the premises of the building and route data indicating moving routes that connect the plurality of guide points on the presented structural drawing of the premises of the building;

a guidance information generation unit configured to generate guidance information by inputting landmark data or landscape data, which serve as landmarks in a plurality of line-of-sight directions upon approaching or existing from each of the plurality of guide points of the structure information; and a communication device configured to send the structure information and the guidance information for each guide point to the server.

25. A terminal according to claim 24, further comprising a compiler which compiles the structure information or the guidance information.

26. A terminal according to claim 24, further comprising a position information reception unit configured to receive position information from a position information providing device provided on the premises of the building, and wherein said guidance information generation unit selects a guide point for which guidance information is to be generated, on the basis of the position information received by said position information reception section, and generates guidance information for the selected guide point.

27. A destination guidance data acquisition server which acquires data pertaining to guidance on the premises of a building in accordance with an input from a destination guidance data acquisition terminal, comprising:

a communication device configured to communicate with the destination guidance data acquisition terminal;

a structure information memory which stores structure information corresponding to information received by said communication device, the structure information being generated by designating a plurality of guide points, and route data indicating moving routes that connect the plurality of guide points on a structural drawing of the premises of the building; and a guidance information memory which stores, for each guide point, guidance information corresponding to information received by said communication device, the guidance information being generated by inputting landmark data or landscape data which serve as landmarks in a plurality of line-of-sight directions upon approaching or existing from each of the plurality of guide points of the structure information.

28. A server according to claim 27, further comprising:

an input unit configured to input the structural drawing of the premises of the building; and a structure information generation unit configured to generate structure information by setting a plurality of guide points, and route data indicating moving routes that connect the plurality of guide points on the input structural drawing.

29. A server according to claim 27, further comprising a guidance information assist unit configured to generate the guidance information corresponding to movement of a viewpoint along the route data by interpolating the input landmark data or landscape data.

30. A destination guidance data acquisition method comprising:

generating structure information by designating a plurality of guide points on the premises of the building and route data indicating moving routes that connect the plurality of guide points on a structural drawing of the premises of a building;

storing the structure information;

generating guidance information by inputting landmark data or landscape data, which serve as landmarks in a plurality of line-of-sight directions upon approaching or existing from each of the plurality of guide points of the structure information;

storing the guide information for each guide point; and presenting at least one of the structural drawing of the premises of the building, the structure information, and the guidance information.

31. A method according to claim 30, further comprising compiling the structure information or the guidance information.

32. A computer readable memory comprising:

means for causing a computer to communicate with a destination guidance data acquisition terminal;

first storage means for causing a computer to store structure information, which is information received via the communication, and is generated by designating a plurality of guide points, and route data indicating moving routes that connect the plurality of guide points on a structural drawing on the premises of the building; and second storage means for causing a computer to store, for each guide point, guidance information which is information received via the communication, and is generated by inputting landmark data or landscape data which serve as landmarks in a plurality of line-of-sight directions upon approaching or existing from each of the plurality of guide points of the structure information.

33. A computer readable memory storing a guidance program, the guidance program comprising:

means for causing a computer to present a structural drawing of premises of a building;

first generation means for causing a computer to generate structure information by designating a plurality of guide points on the premises of the building and route data indicating moving routes that connect the plurality of guide points on the presented structural drawing of the premises of the building;

second generation means for causing a computer to generate guidance information by inputting landmark data or landscape data, which serve as landmarks in a plurality of line-of-sight directions upon approaching or existing from each of the plurality of guide points of the structure information; and means for causing a computer to send the structure information and the guidance information for each guide point to the server.

34. A memory according to claim 33, further comprising:

means for causing a computer to receive position information from a position information providing device provided on the premises of the building; and means for causing a computer to select a guide point for which guidance information is to be generated, on the basis of the received position information, and generate guidance information for the selected guide point.

35. A memory according to claim 33, the guidance program further comprising: means for causing a computer to compile the structure information or the guidance information.

* * * * *